US012736374B2

(12) United States Patent
Shaw et al.

(10) Patent No.: US 12,736,374 B2
(45) Date of Patent: Sep. 15, 2026

(54) CYLINDER SENSOR ASSEMBLY

(71) Applicant: ENERPAC TOOL GROUP CORP., Milwaukee, WI (US)

(72) Inventors: Robin Shaw, Whitley Bay (GB); Thomas William Matthew Davies, Winlaton (GB); Tony Dixon, Rowlands Gill (GB); Juan Carlos Gomez Moreno, Madrid (ES); Jorge Gonzalez Gomez, Madrid (ES); Jesus Gonzales, Alcobendas (ES); Justin Flood, Menomonee Falls, WI (US); Tess Powers, Milwaukee, WI (US); Liam Coyne, Menomonee Falls, WI (US); Charles Pritz, Menomonee Falls, WI (US); Alex Barbaras, Menomonee Falls, WI (US); Carley Korte, Menomonee Falls, WI (US); Roger Pili, Cambridge, WI (US); Alberto Larrea, San Sebastian (ES)

(73) Assignee: ENERPAC TOOL GROUP CORP., Milwaukee, WI (US)

( * ) Notice: Subject to any disclaimer, the term of this patent is extended or adjusted under 35 U.S.C. 154(b) by 240 days.

(21) Appl. No.: 18/727,267

(22) PCT Filed: Jan. 27, 2023

(86) PCT No.: PCT/US2023/011766

§ 371 (c)(1),
(2) Date: Jul. 8, 2024

(87) PCT Pub. No.: WO2023/147072

PCT Pub. Date: Aug. 3, 2023

(65) Prior Publication Data

US 2025/0123123 A1 Apr. 17, 2025

Related U.S. Application Data

(60) Provisional application No. 63/303,738, filed on Jan. 27, 2022.

(51) Int. Cl.
*G01D 5/16* (2006.01)
*G01L 9/00* (2006.01)
*H04W 4/38* (2018.01)

(52) U.S. Cl.
CPC .............. *G01D 5/16* (2013.01); *G01L 9/0027* (2013.01); *H04W 4/38* (2018.02)

(58) Field of Classification Search
CPC ........ G01D 5/16; G01D 11/245; G01D 11/30; G01L 9/0027; H04W 4/38; F15B 15/2815;

(Continued)

(56) References Cited

U.S. PATENT DOCUMENTS 4,286,386 A 9/1981 Long
5,977,778 A * 11/1999 Chan .................. F15B 15/2815 91/361

(Continued)

FOREIGN PATENT DOCUMENTS

EP 2072963 A1 6/2009
EP 3757402 A1 12/2020

OTHER PUBLICATIONS

International Search Report and the Written Opinion for PCT/US2023/011766, dated May 22, 2023.

(Continued)

*Primary Examiner* — Toan N Pham
(74) *Attorney, Agent, or Firm* — Andrus Intellectual Property Law, LLP

(57) ABSTRACT

A cylinder sensor assembly, a system, and a method of operating a piston-cylinder assembly. The sensor assembly (Continued)

may generally include a housing; a sensor supported by the housing and configured to sense a position of a piston relative to a cylinder; and a wireless transmitter supported by the housing and configured to output a communication signal representative of a sensed position of the piston.

24 Claims, 31 Drawing Sheets

(58) Field of Classification Search
CPC .............. F15B 15/2853; F15B 15/2876; F15B 2211/6309; F15B 2211/6313; F15B 2211/6336; F15B 2211/6346; F15B 15/283; F15B 15/2892; H04Q 2209/40; H04Q 9/00
See application file for complete search history.

(56) References Cited

U.S. PATENT DOCUMENTS 6,509,733 B2 * 1/2003 Blubaugh ........... F15B 15/2892 324/207.13
6,848,323 B2 * 2/2005 Krouth ................ F15B 15/2838 73/861.47
7,456,385 B2 * 11/2008 Engstrand ................ G01D 5/34 91/1
9,303,713 B2 * 4/2016 Ehre .................. F15B 15/2861
10,718,361 B2 7/2020 Steinich
2005/0081710 A1 * 4/2005 Albright ............. F15B 15/2815 92/5 R
2007/0044652 A1 3/2007 Dunn
2011/0067565 A1 3/2011 Steinich
2015/0159459 A1 6/2015 Liotta
2018/0094407 A1 4/2018 Hayes
2020/0248773 A1 8/2020 Chandrashekar

OTHER PUBLICATIONS

International Preliminary Report on Patentability for Corresponding International Application No. PCT/US2023/011766, dated Aug. 8, 2024.
Extended European search report for EP Application No. 23747662.7, dated Jan. 2, 2026.

* cited by examiner

PLEASE ATTACH SENSOR
TO THE CYLINDER
126
122
14
10
118
P 18
22
14
130
62
10

LIFTING IN-PROGRESS
LIFT
STROKE
WEIGHT
BALANCE
DISTANCE
LIFT
4.5 4.5 4.5 4.5
1 2 3 4
PAIRED DEVICES
EXIT LIFTING
18
14
10
P 10B
178'
26B'
182'
186'
116B'

10B
178'
182'
26B'
170'
186'
116B'
174'

10B
200
204
26B 204
26B 204
26B 10B
200
204
26B 204
26B

186

186

186

186

186

208
208

208
186
208

212
220
216A
18
130A
228A 220A
212
216A
130A
228A
18

228A
130A
220A

CYLINDER SENSOR ASSEMBLY

CROSS REFERENCE TO RELATED APPLICATIONS

This application is the U.S. national stage application of International Application PCT/US2023/011766, filed Jan. 27, 2023, which international application was published on Aug. 3, 2023, as International Publication WO 2023/147072 in the English language. The International Application claims priority to U.S. Provisional Patent Application No. 63/303,738, filed Jan. 27, 2022. The international application and U.S. application are both incorporated herein by reference, in entirety.

FIELD

The present invention relates to a piston and cylinder assembly and, more particularly, to a sensor assembly for a hydraulic cylinder assembly.

SUMMARY

A piston and cylinder assembly generally includes a piston supported by and movable (e.g., extending or retracting) relative to a cylinder under the force of a fluid (e.g., oil, air, etc.).

In one independent aspect, a cylinder sensor assembly may generally include a housing; a sensor configured to sense a position of a piston relative to a cylinder; and a wireless transmitter supported by the housing and configured to output a communication signal representative of a sensed position of the piston.

In another independent aspect, a system may generally include a piston-cylinder assembly including a cylinder and a piston movably supported relative to the cylinder; and a sensor assembly. The sensor assembly may include a housing, a sensor configured to sense a position of the piston relative to the cylinder, and a wireless transmitter supported by the housing and configured to output a communication signal representative of a sensed position of the piston.

In yet another independent aspect, a method of operating a piston-cylinder assembly may be provided. The method may generally include sensing, with a position sensor, a position of a piston relative to a cylinder; and wirelessly communicating, with a wireless transmitter supported by a housing, a communication signal representative of the position sensed by the position sensor.

In a further independent aspect, a cylinder sensor assembly may generally include a housing; a position sensor configured to sense a position of a piston relative to a cylinder; a pressure sensor supported by the housing and configured to sense a pressure of fluid supplied to the cylinder; a wireless transmitter supported by the housing and configured to output a communication signal representative of a condition sensed by one of the position sensor and the pressure sensor; and an electronic processor supported by the housing and in communication with the position sensor, the pressure sensor and the transmitter.

Independent features and independent advantages of the invention may become apparent to those skilled in the art upon review of the following detailed description, claims and drawings.

DETAILED DESCRIPTION

Figure 1:
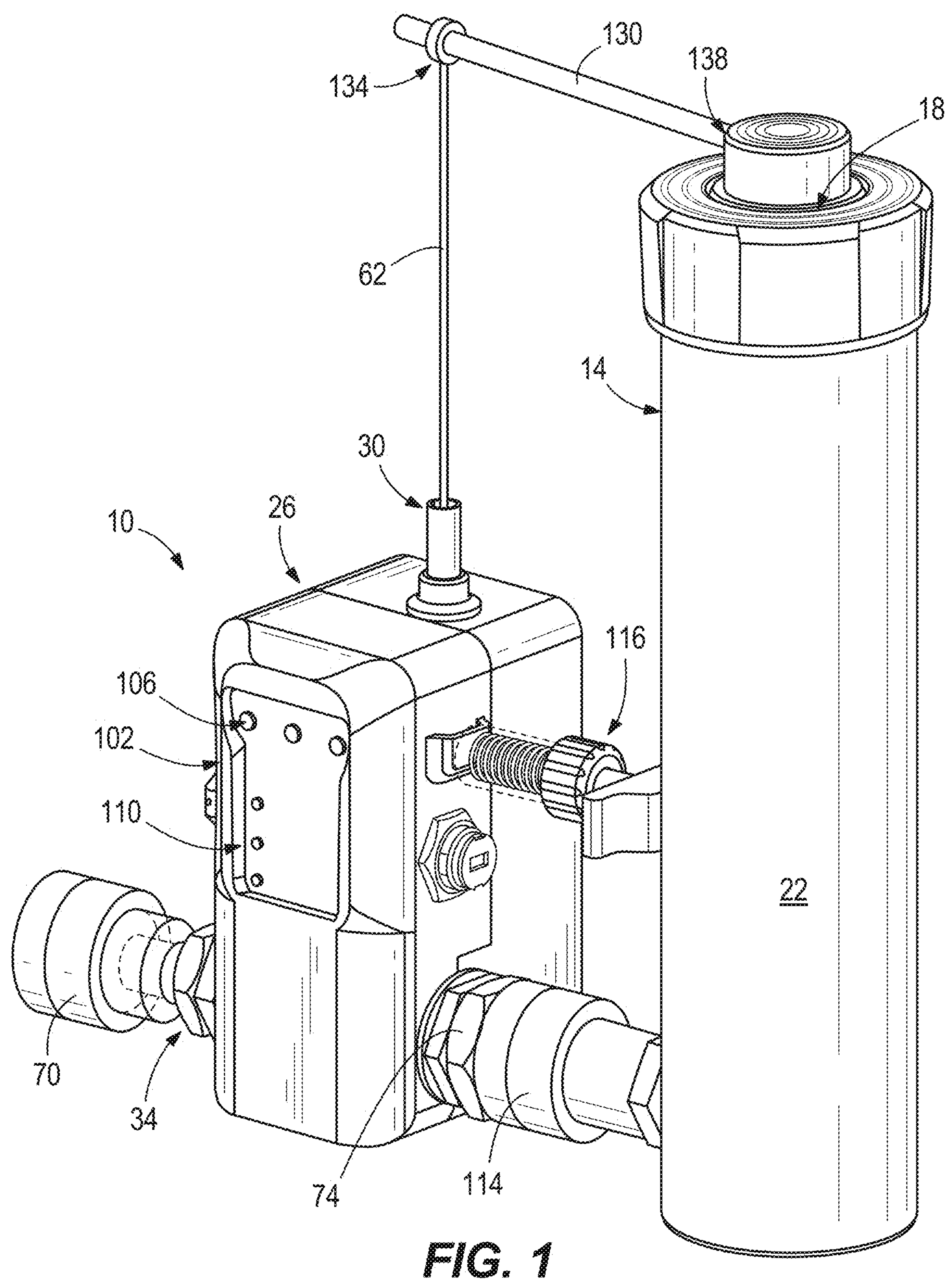
FIG. 1 is a perspective view of a cylinder sensor assembly for use with a cylinder assembly.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways.

Also, it is to be understood that the phraseology and terminology used herein is for the purpose of description and should not be regarded as limiting.

The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. In addition, the terms "connected" and "coupled" and variations thereof are not restricted to physical or mechanical connections or couplings.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use, etc.) associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10% or more) of an indicated value.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Many of the modules and logical structures described are capable of being implemented in software executed by a microprocessor or a similar device or of being implemented in hardware using a variety of components including, for example, application specific integrated circuits ("ASICs"). Terms like "controller" and "module" may include or refer to both hardware and/or software. Capitalized terms conform to common practices and help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

Figures 2A, 2B, 2C:
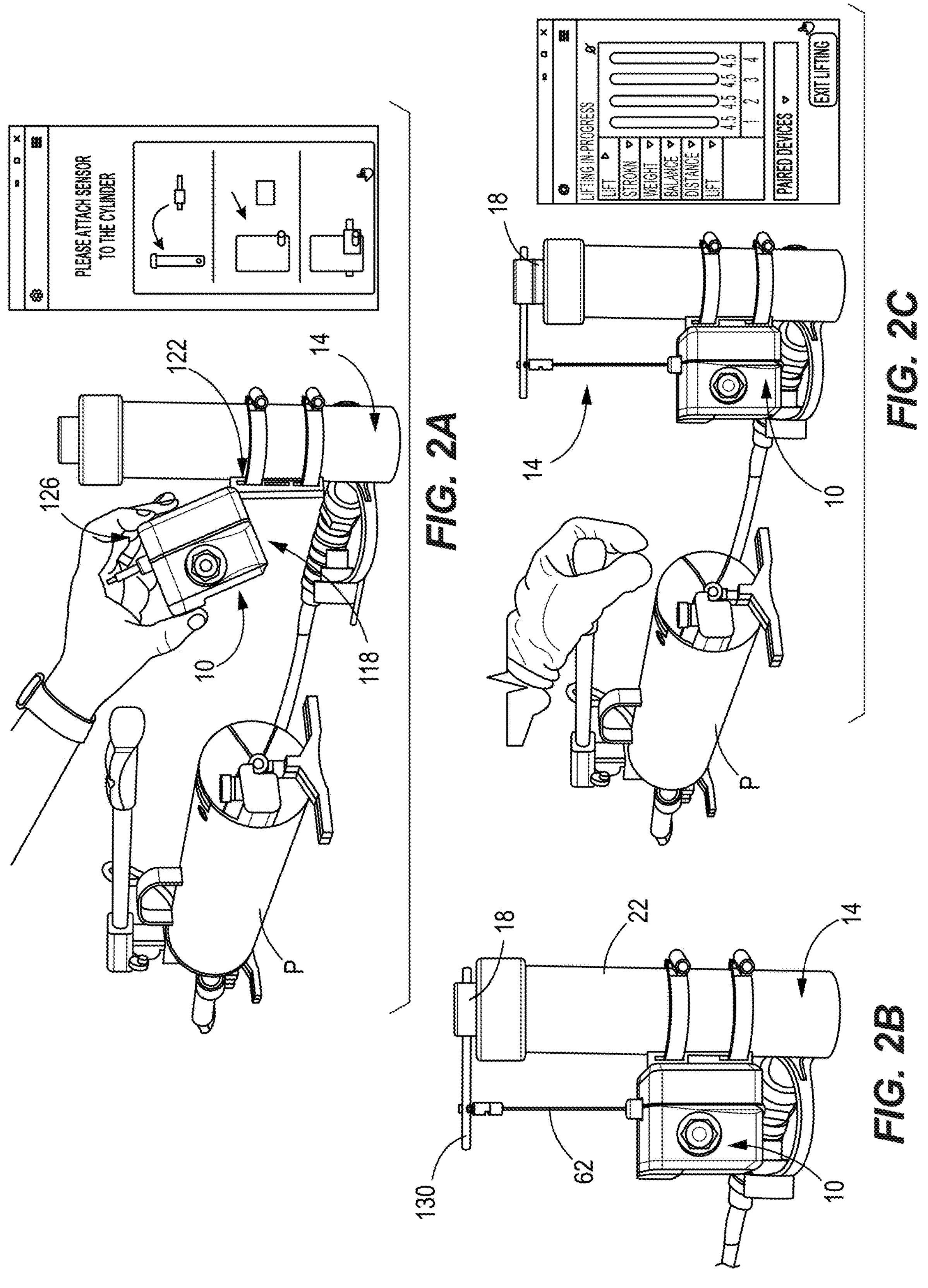
FIGS. 2A-2C are perspective views of an alternative construction of a cylinder sensor assembly and illustrate use of the sensor assembly with the cylinder assembly.

FIGS. 1-6 illustrate a cylinder sensor assembly 10 for use with a cylinder assembly 14 (e.g., a hydraulic cylinder assembly, as shown in FIGS. 1-2C). In independent aspects, the illustrated sensor assembly 10 is operable to sense the position of a piston 18 relative to a cylinder 22 and to communicate this information to a user (e.g., via wireless (Bluetooth) communication). The sensor assembly 10 and associated cylinder assembly 14 may be part of a system including multiple different sensor assemblies 10, each with a different cylinder assembly 14.

The sensor assembly 10 includes (see FIGS. 4-6) a housing assembly 26 supporting a position sensor (e.g., a wire stroke sensor 30, as illustrated), a hydraulic coupler 34, a controller 38, communication components (e.g., a wireless (Bluetooth) transceiver 42), and a power source (e.g., a battery 46). The housing assembly 26 includes front and rear housing portions 50, 54, and the components of the sensor assembly 10 are housed in the cavity defined by the portions 50, 54.

The illustrated position sensor is a wire stroke sensor 30 and generally includes a stroke sensor housing 58, an extendable and retractable cable or wire 62, and a potentiometer (not shown) operable to output a signal representative of the extension/retraction of the wire 62. In some constructions, the wire stroke sensor 30 may be a compact string pot, Model No. SP1-*, available from Measurement Specialties, Inc., Chatsworth, California. As shown in FIG. 4B, the wire stroke sensor 30 is positioned in the rear housing portion 54 with the wire 62 extending through a seal 66.

As discussed below, an end of the wire 62 is connected to the piston 18, and the wire stroke sensor 30 is configured to measure the stroke of the piston 18 to thereby determine the position of the piston 18 relative to the cylinder 22. In other constructions (not shown), the position sensor may include a different type of sensor, such as, for example, a laser sensor which may be positioned in a void space in the cylinder assembly.

The hydraulic coupler 34 is supported (see FIGS. 4A-4B) between the housing portions 50, 54. The illustrated coupler 34 is an in-line coupler having (see FIG. 5) a first port connector 70 connectable to a fluid supply (e.g., a pump P (see FIGS. 2A and 2C)) and a second port connector 74 connectable to the cylinder assembly 14. Hydraulic fluid thus flows through the hydraulic coupler 34 and through the sensor assembly 10 between the pump P and the cylinder assembly 14.

In the illustrated construction, the sensor assembly 10 includes a fluid pressure sensor 78. The illustrated pressure sensor 78 includes a strain gauge pressure measurement device integrated into the coupler 34. In one embodiment (see FIG. 4B), the pressure sensor 78 fits in a groove 80 on the exterior of the coupler 34. In another embodiment (see FIG. 4C), the pressure sensor 78 is inserted (e.g., threaded) into an opening 80' in the coupler 34. As fluid flows through the coupler 34, the pressure sensor 78 senses and outputs a signal representative of the fluid pressure. Because the pressure sensor 78 is positioned close to/at the cylinder assembly 14, any pressure loss over a length of hose is eliminated to achieve a more accurate pressure measurement.

In some constructions (see FIG. 5), the sensor assembly 10 includes a tilt/movement sensor 82. The tilt/movement sensor 82 is configured to sense tilting, orientation, position, and/or movement of the sensor assembly 10 (e.g., relative to the cylinder assembly 14 (as shown), relative to the surrounding workspace, etc.) and to output a signal representative of the sensed condition. Any sensed tilting or movement of the sensor assembly 10 can, for example, be taken into account when determining the position of the piston 18 relative to the cylinder 22 which may improve accuracy of the measurement, cause other action to be taken (e.g., provide a warning to a user, stop a lifting operation, etc.).

Figure 4A:
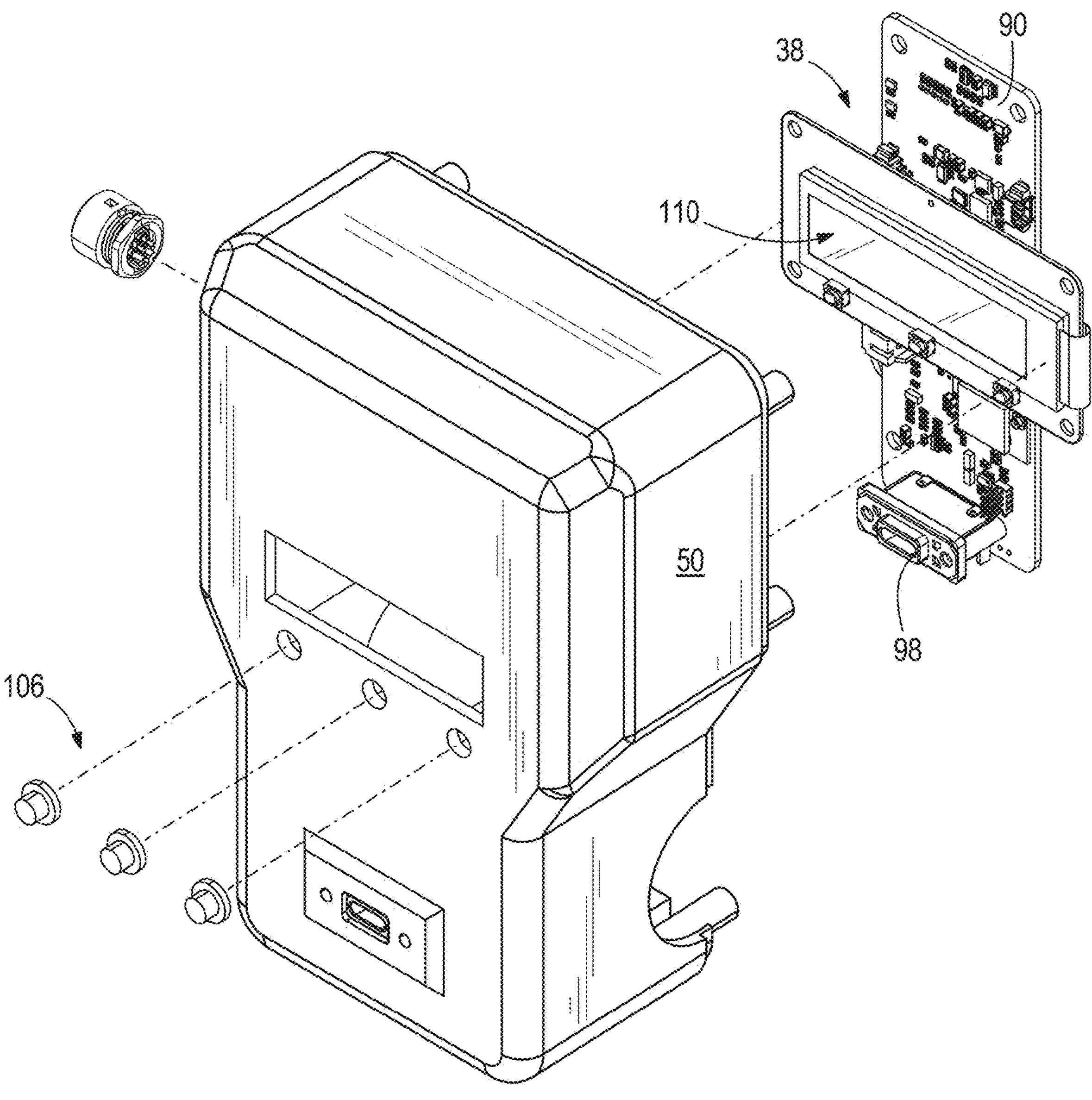
FIGS. 4A-4C are exploded views of portions of the sensor assembly shown in FIG. 3
Figure 4B:
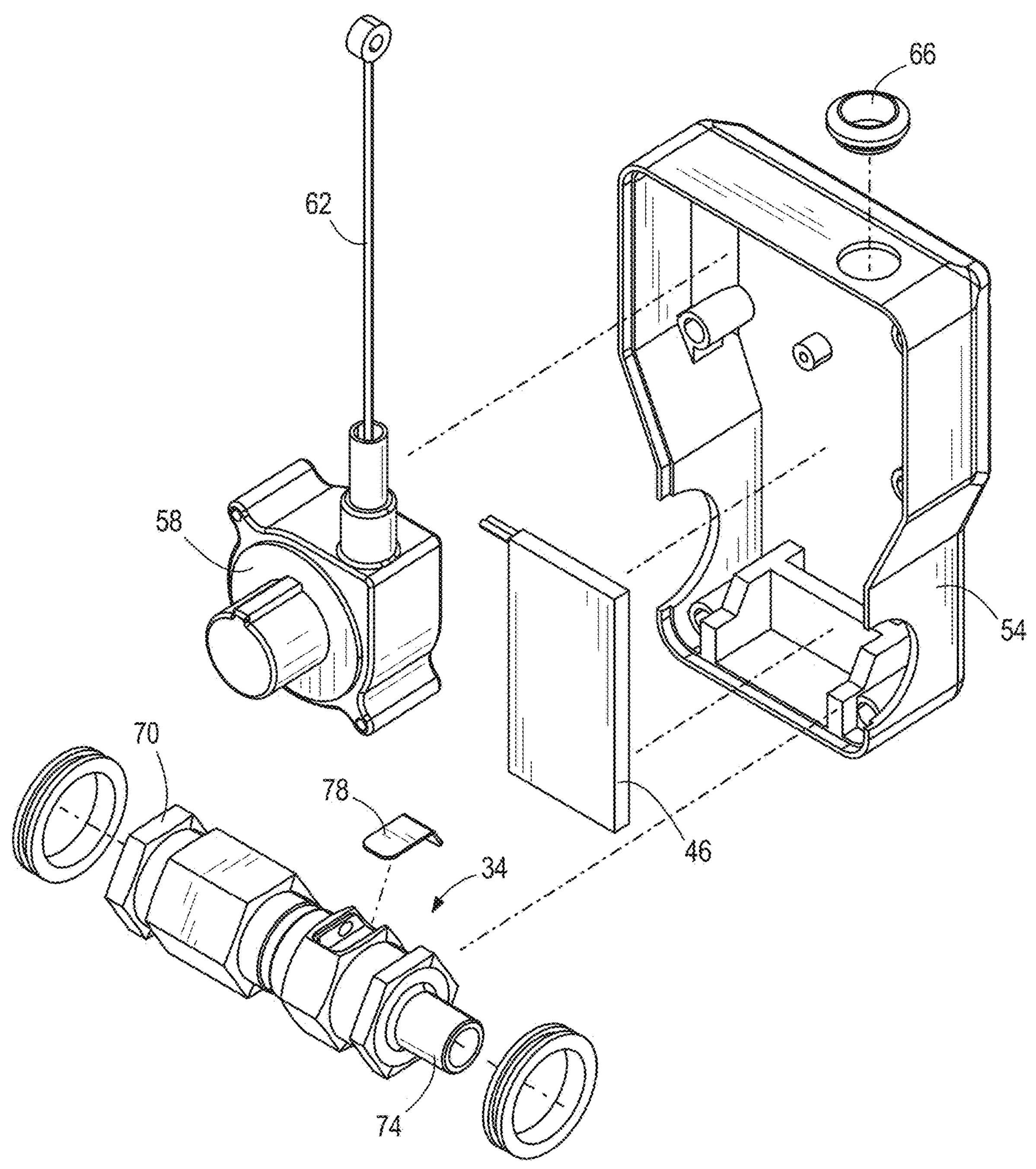
Figure 4C:
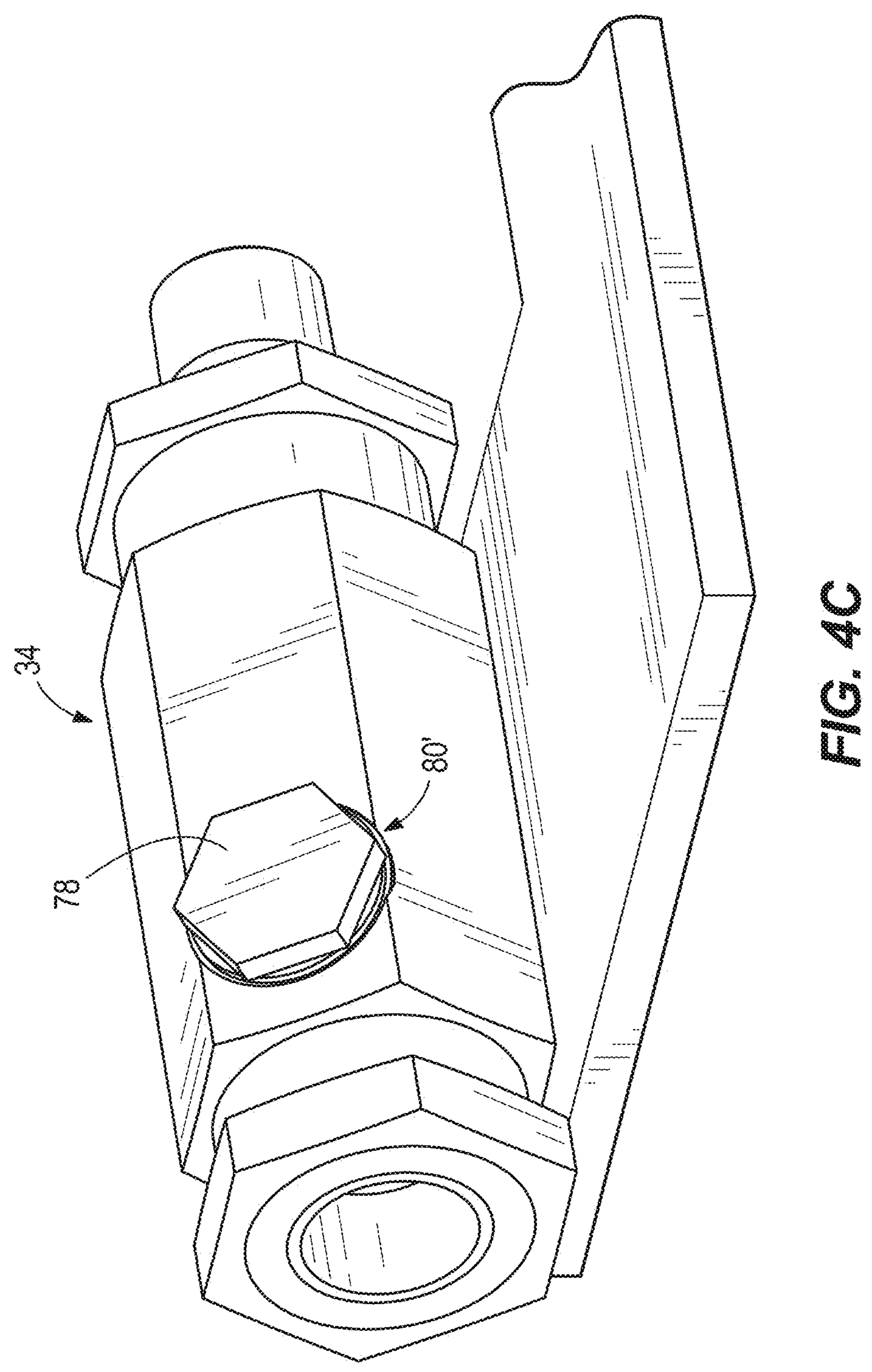
Figure 5:
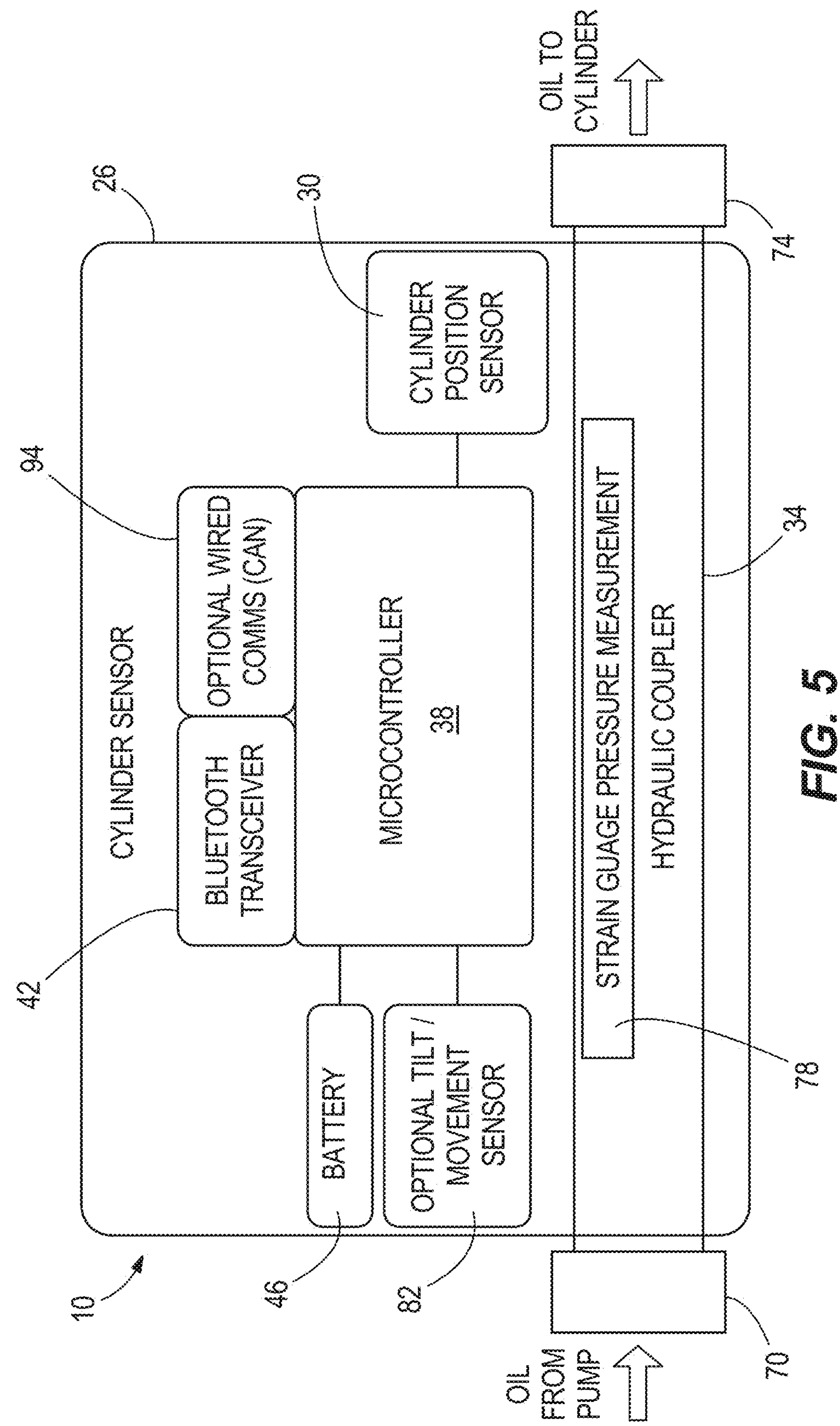
FIG. 5 is a schematic diagram of a cylinder sensor assembly.
Figure 6:
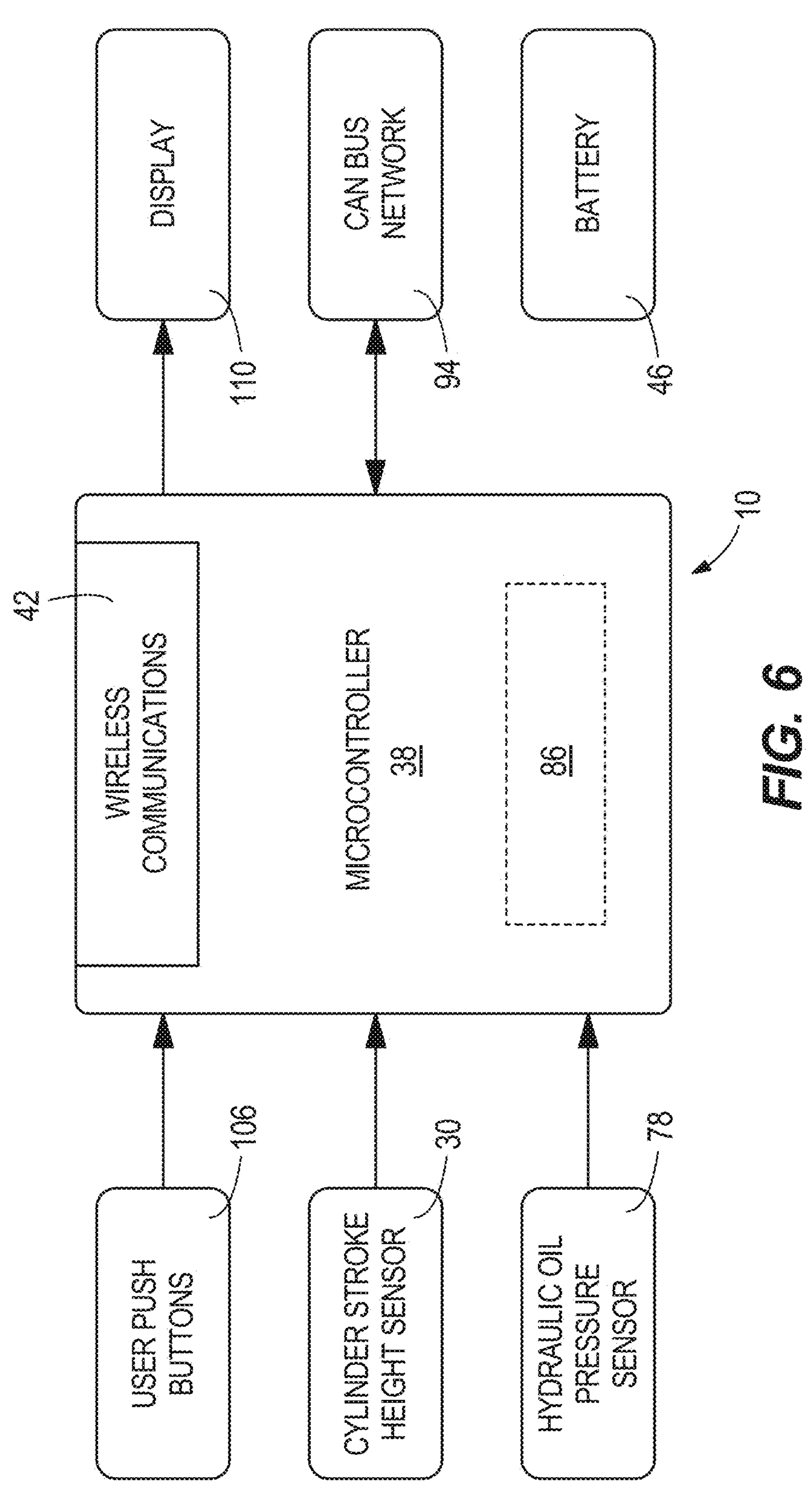
FIG. 6 is a schematic diagram of an alternative construction of a cylinder sensor assembly.

As shown in FIG. 4A, the controller 38 is supported in the front housing portion 50. The controller 38 includes an electronic processor 86 (schematically illustrated) mounted on a printed circuit board (PCB) 90. The controller 38 is connected to and communicates with (e.g., receives measurement signals from) the wire stroke sensor 30 and, if provided, the pressure sensor 78, the tilt/movement sensor 82, one or more additional sensors (not shown).

The controller 38 is electrically and/or communicatively connected to a variety of modules or components of the sensor assembly 10. The controller 38 includes a plurality of electrical and electronic components that provide power, operational control, and protection to the components and modules within the controller 38 and/or the sensor assembly 10. For example, the controller 38 includes, among other things, the electronic processor 86 (a programmable electronic microprocessor, microcontroller, or similar device), a memory (not shown), and an input/output (I/O) interface (not shown). The electronic processor 86 is communicatively coupled to the memory and the I/O interface.

The controller 38 may be implemented in several independent controllers each configured to perform specific functions or sub-functions. Additionally, the controller 38 may contain sub-modules that include additional electronic processors, memory, or application specific integrated circuits (ASICs) for handling communication functions, processing of signals, and application of the methods listed below. In other embodiments, the controller 38 includes additional, fewer, or different components.

The memory is, for example, a non-transitory, machine-readable memory. The memory includes, for example, one or more non-transitory machine-readable media, a program storage area and a data storage area. The program storage area and the data storage area can include combinations of different types of memory, such as read-only memory (ROM) and random access memory (RAM). In some embodiments, data is stored in a non-volatile random-access memory (NVRAM) of the memory. Various non-transitory computer readable media, for example, magnetic, optical, physical, or electronic memory may be used.

In the illustrated embodiment, the memory includes an input controller engine (not shown; for example, software or a set of computer-readable instructions that determines functions to be executed in response to inputs) and sensor assembly functions (for example, software or a set of computer-readable instructions that provide functionality to the sensor assembly 10).

The electronic processor 86 is communicatively coupled to the memory and executes software instructions that are stored in the memory, or stored in another non-transitory computer readable medium such as another memory or a disc. The software may include one or more applications, program data, filters, rules, one or more program modules, and other executable instructions. In some embodiments, the memory stores predetermined functions, such as, for example, a calibration or tare function (e.g., displaying options to a user and executing functionality to allow a user to calibrate or tare the sensor assembly 10) as well as other functions that are executed to provide a sensor assembly functionality, within the program storage area.

The I/O interface is communicatively coupled to components external to the controller 38 and coordinates the communication of information between the electronic processor 86 and other components of the sensor assembly 10. In illustrated examples, information received from an input component, an external device, etc. is provided to the electronic processor 86 to assist in determining functions to be executed and outputs to be provided. The determined functionality is executed with the electronic processor 86 with the software located the memory.

The communication components are on the PCB 90 and are configured to communicate with external devices (e.g., an external control device (a smart phone, a tablet, a computing device, a dedicated system control device), a data collection device, a pump, a cylinder assembly, another cylinder sensor assembly 10, etc.). In the illustrated construction, the communication components include at least the wireless transceiver 42 configured to transmit and receive signals wirelessly with one or more external devices (not shown but also including complementary communication components (e.g., a wireless transceiver), a controller configured to process signals, and a user interface configured for communication with the user) using for example, Wi-Fi, Bluetooth, cellular networks, telematic networks, etc. The transceiver 42 communicates with (e.g., receives signals from and transmits signals to) the controller 38. For example, the controller 38 outputs signals representative of measured values (e.g., position, pressure, tilt, movement, etc.) from the sensors 30, 78, 82 to the transceiver 42 for communication externally from the sensor assembly 10.

Figure 3:
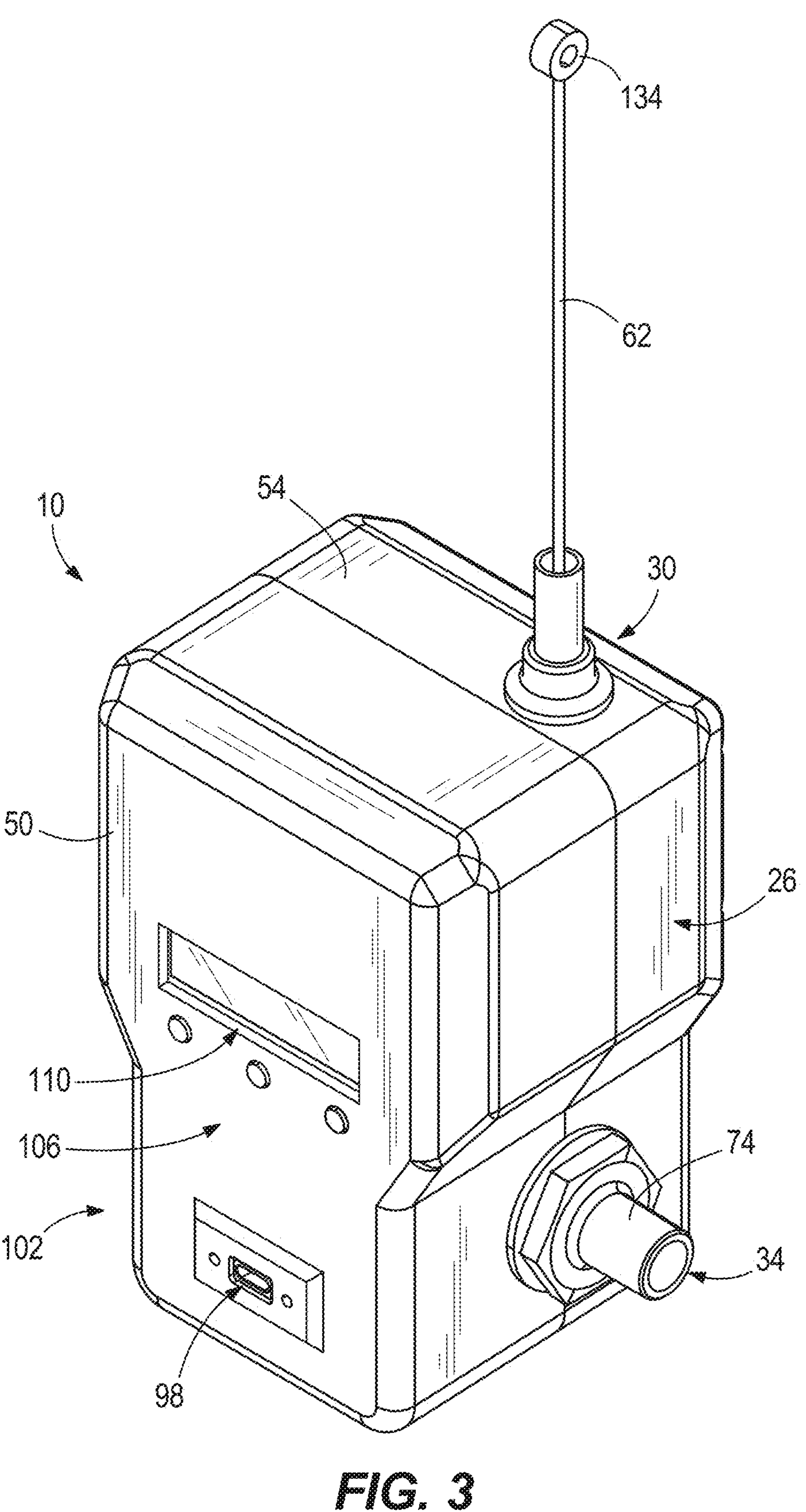
FIG. 3 is a perspective view of another alternative construction of a cylinder sensor assembly.

In some constructions (see FIGS. 5-6), the sensor assembly 10 includes a controller area network (CAN) bus 94 configured for wired communication with an external device or devices. As shown in FIGS. 3-4, a port 98 (e.g., universal serial bus (USB; as shown) is provided for connection, communication and/or power supply (e.g., to charge the battery 46, to power electronic components of the sensor assembly 10, etc.). Alternatively or additionally, another type of port, such as, for example, Ethernet, serial advanced technology attachment (SATA), integrated drive electronics (IDE), etc., may be provided.

The illustrated sensor assembly 10 includes (see FIGS. 1, 3-4A, and 6) a user interface 102 configured to receive input from and/or output information to a user concerning the sensor assembly 10, the cylinder assembly 14, the system, etc. In the illustrated constructions, the user interface 102 is not for use during lifting operations but is, instead, used during set up, pairing, troubleshooting, etc.

The interface 102 includes a user input 106 (e.g., buttons, switches, a keypad, a touch screen, etc.) to receive one or more inputs (e.g., a selection, a command, etc.) from the user. For example, the user input 106 may include a power button, a "pair" button for use in wirelessly connecting the sensor assembly 10 to an external device, a "select" button, etc.

The interface 102 includes a user output 110 (e.g., a display (a liquid crystal display (LCD; as shown), a light-emitting diode (LED) display), an indicator (one or more LED lights, an audible output), etc.) to provide information to the user, for example, on the set up, operation, status, etc. of the sensor assembly 10, the cylinder assembly 14, and/or other components of the system. For example, the user output 110 may include a battery charge indicator, a communication connection indicator, a status indicator for the sensor assembly 10 and/or the cylinder assembly 14 (e.g., "CALIBRATING", "LIFTING", etc.), an output of a sensor 30, 78, 82, etc.

The battery 46 powers the controller 38 and other electronic components of the sensor assembly 10 (e.g., the sensor(s) 30, 78, 82, the user interface 102, etc.). The illustrated battery 46 is a rechargeable battery having a Lithium-ion chemistry. As mentioned above, the battery 46 may be recharged through a cable (not shown) between the port 98 and a power source (not shown). In other constructions (not shown), the battery 46 may have a different chemistry (e.g., NiCd, NiMH, etc.) and/or may be replaceable.

Assembly of the sensor assembly 10 with the cylinder assembly 14 is illustrated in FIGS. 1-2. In FIG. 1, the sensor assembly 10 is connected to the cylinder assembly 14 through connection of the port connector 74 to a fluid port 114 of the cylinder 22. With this connection, the sensor assembly 10 is substantially held in place relative to the cylinder assembly 14. A support assembly 116 provides further connection and structural support between the sensor assembly 10 and the cylinder assembly 14. The fluid supply (e.g., the pump P) is connected to the port connector 70 of the hydraulic coupler 34.

In FIG. 2, the sensor assembly 10 does not include a hydraulic coupler 34. A connection assembly 118 is provided to support the sensor assembly 10 on the cylinder assembly 14. The connection assembly 118 includes interengaging connection portions 122, 126 on the cylinder assembly 14 (on the cylinder 22) and the sensor assembly 10, respectively. The illustrated connection portions 122, 126 have a complementary projection and slot, respectively, engaged when the sensor assembly 10 is slid onto the cylinder assembly 14.

With the sensor assembly 10 supported relative to the cylinder assembly 14, the illustrated position sensor (e.g., the wire stroke sensor 30) is connected to the piston 18. A position sensor interface assembly (e.g., a pin 130) engages the free end of the wire 62 and the piston 18 (e.g., respective openings 134, 138). As the piston 18 extends and retracts relative to the cylinder 22 (and relative to the supported sensor assembly 10), the wire 62 correspondingly extends and retracts to sense the stroke of the piston 18. In other constructions (not shown), the wire 62 may be connected to the load being lifted (e.g., with a connector (for example, a magnet) connected to a portion of the load).

Figures 7, 8:
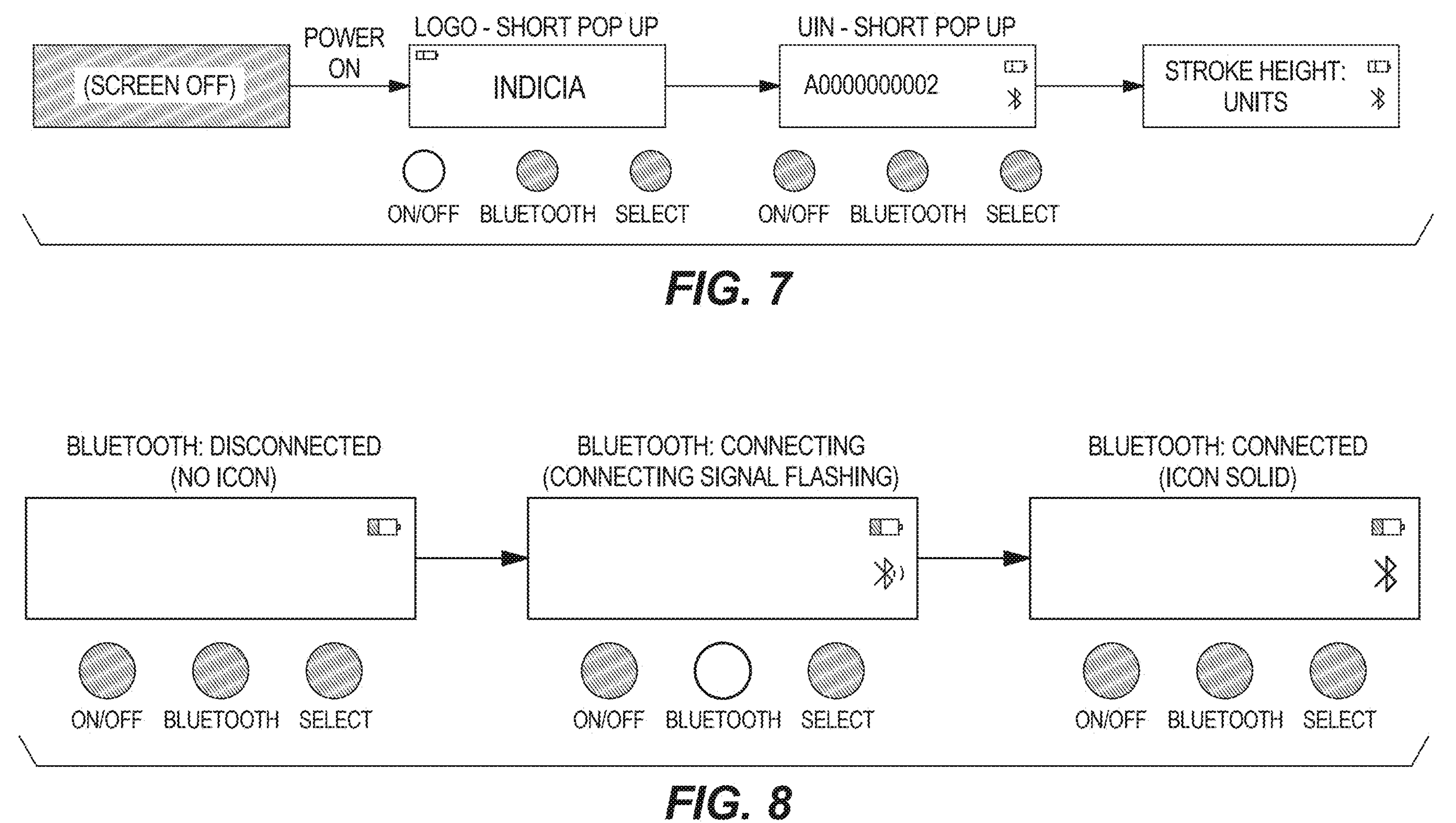
FIG. 7 is a flow chart illustrating a "power on" operation for a cylinder sensor assembly.
FIG. 8 is a flow chart illustrating a wireless communication enabling operation for the cylinder sensor assembly.
Figure 9:
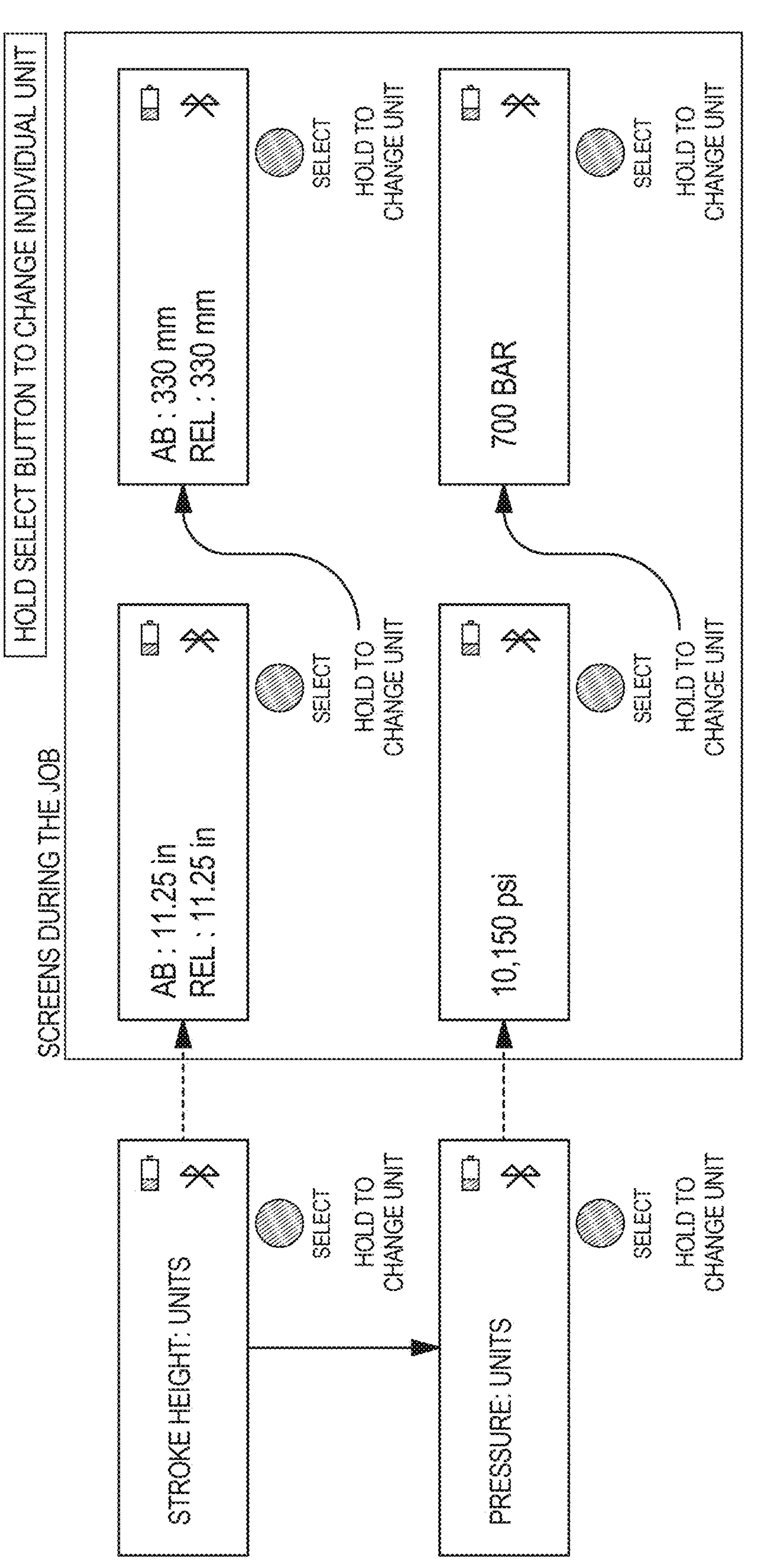
FIG. 9 illustrates example job screens for the cylinder sensor assembly.

FIGS. 7-9 illustrate set up and operation of the sensor assembly 10 with the cylinder assembly 14. FIG. 7 illustrates the "power on" operation for the sensor assembly 10. The power "on/off" button of the user input 106 is depressed, and, from left to right, the user output 110 displays information to the user. FIG. 8 illustrates a wireless communication (Bluetooth) enabling operation for the sensor assembly 10. The "Bluetooth" pair button of the user input 106 is depressed, and, from left to right, the user output 110 displays information on the connection status to the user. FIG. 9 illustrates use of the "Select" button of the user input 106 and displays of the user output 110 during operation of the sensor assembly 10 and the cylinder assembly 14.

Figure 10:
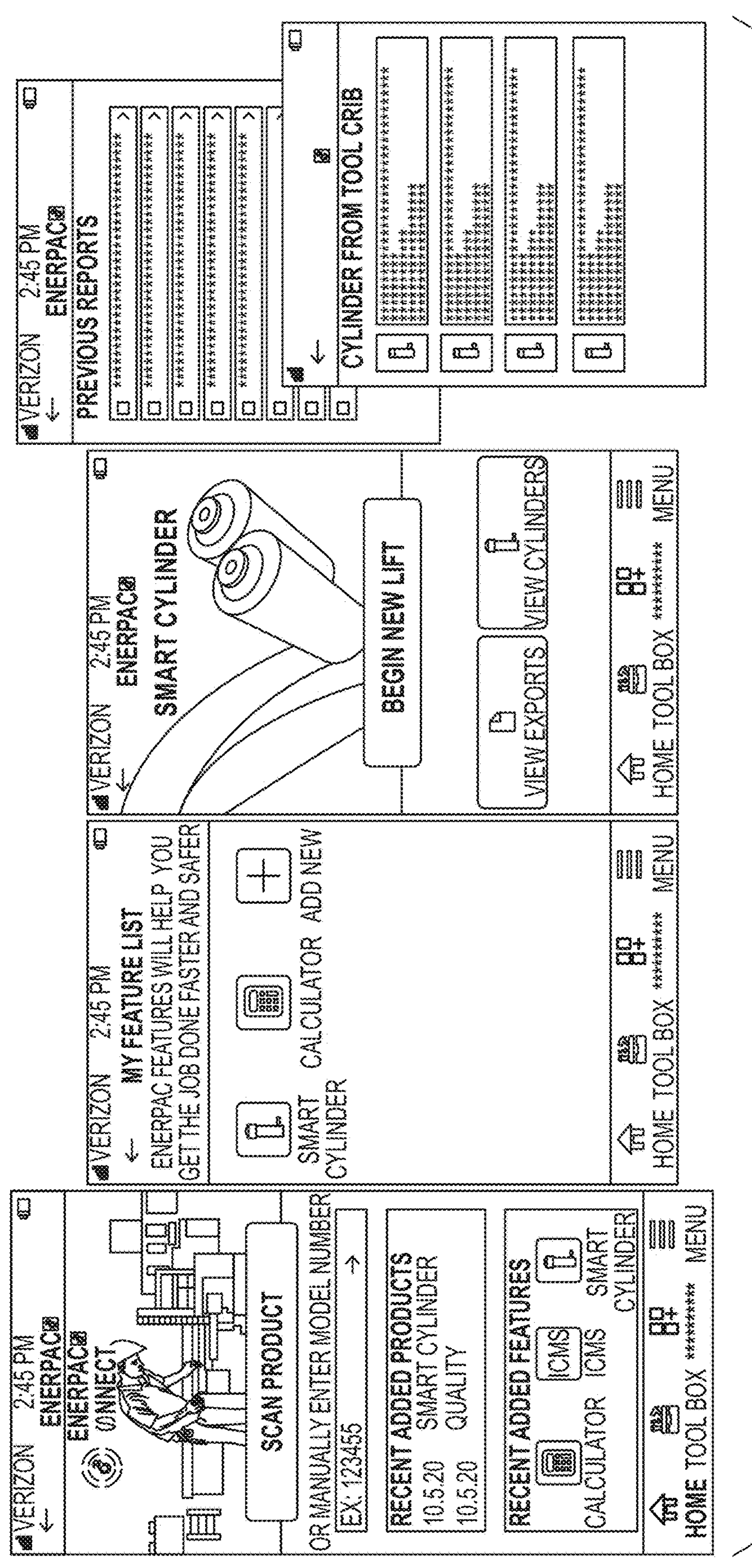
FIG. 10 illustrates example screens of the graphical user interface (GUI) of the program for use of the cylinder sensor assembly.
Figure 11:
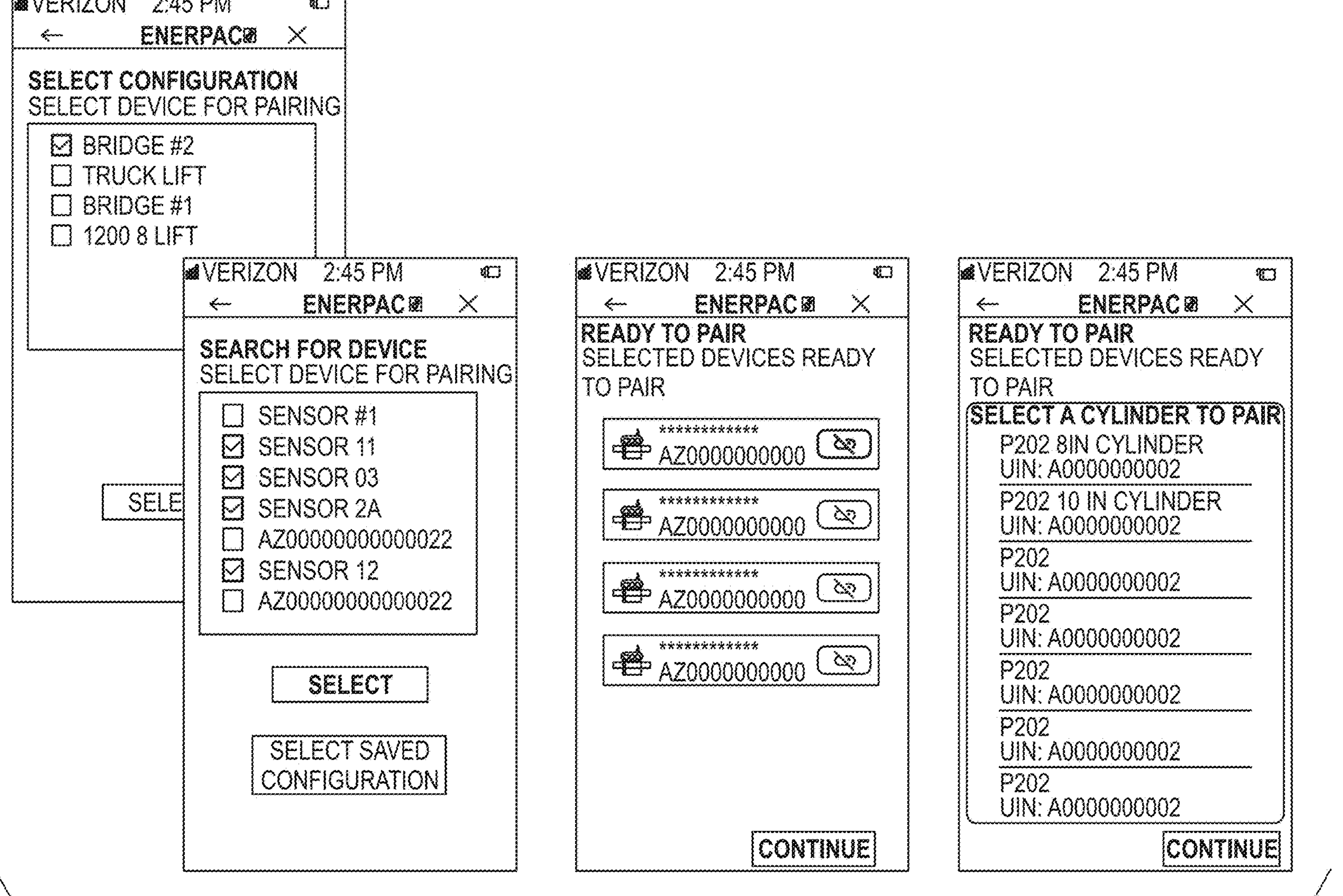
FIG. 11 illustrates example screens of the GUI and a set-up operation for the cylinder sensor assembly.
Figure 11:
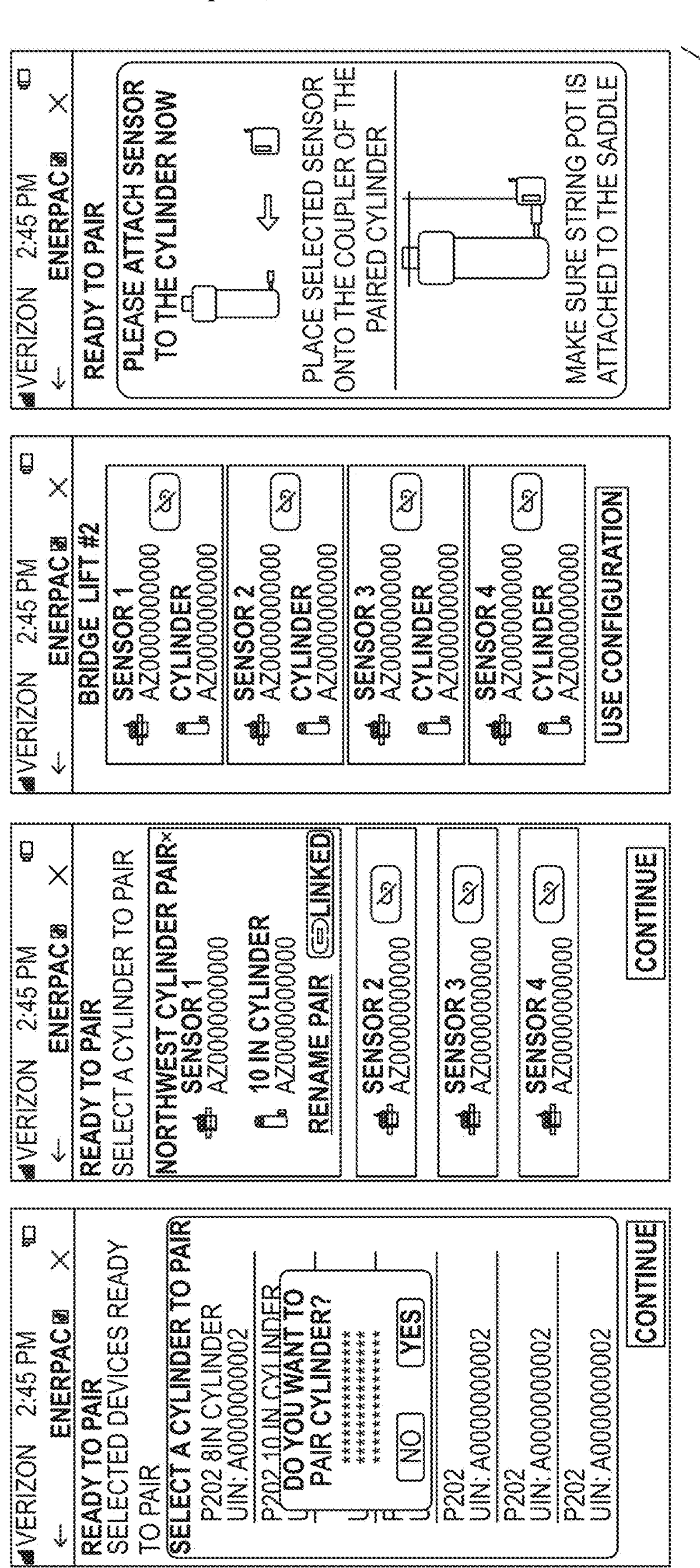
Figure 12:
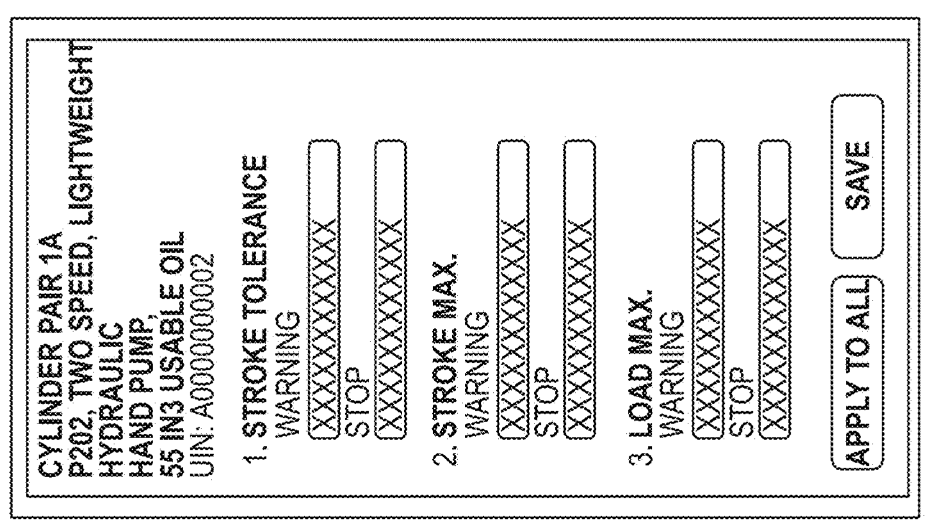
FIG. 12 illustrates example screens of the GUI for the cylinder sensor assembly.

FIGS. 10-14 illustrate example screens of the graphical user interface (GUI) of the program for use of the sensor assembly 10. FIGS. 10 and 12 illustrate example screens in the GUI.

Figure 13:
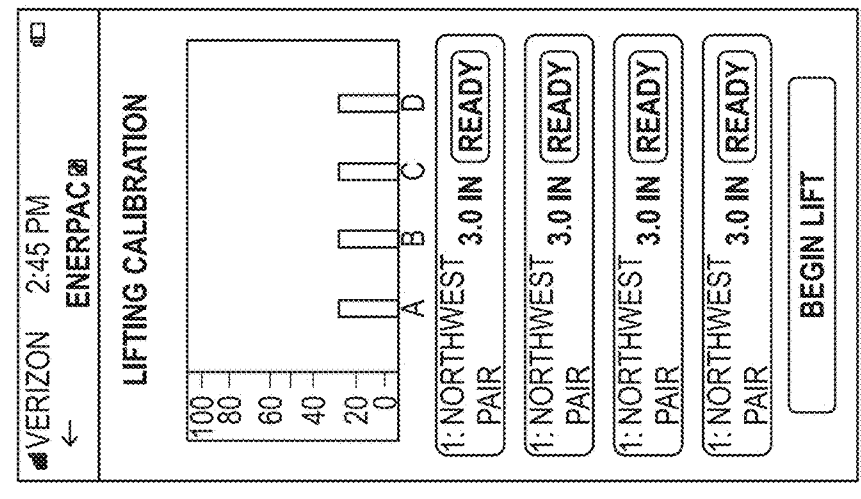
FIG. 13 illustrates example screens of the GUI and a calibration/tare operation for the cylinder sensor assembly.
Figure 13:
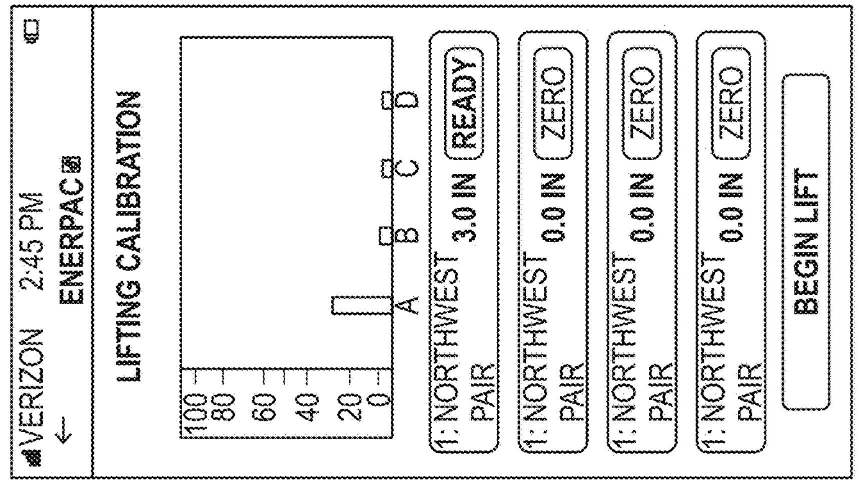
Figure 13:
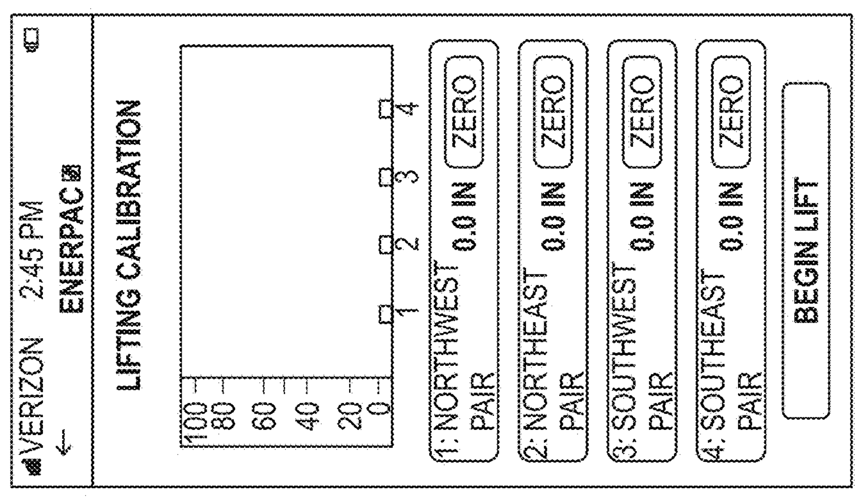
Figure 14:
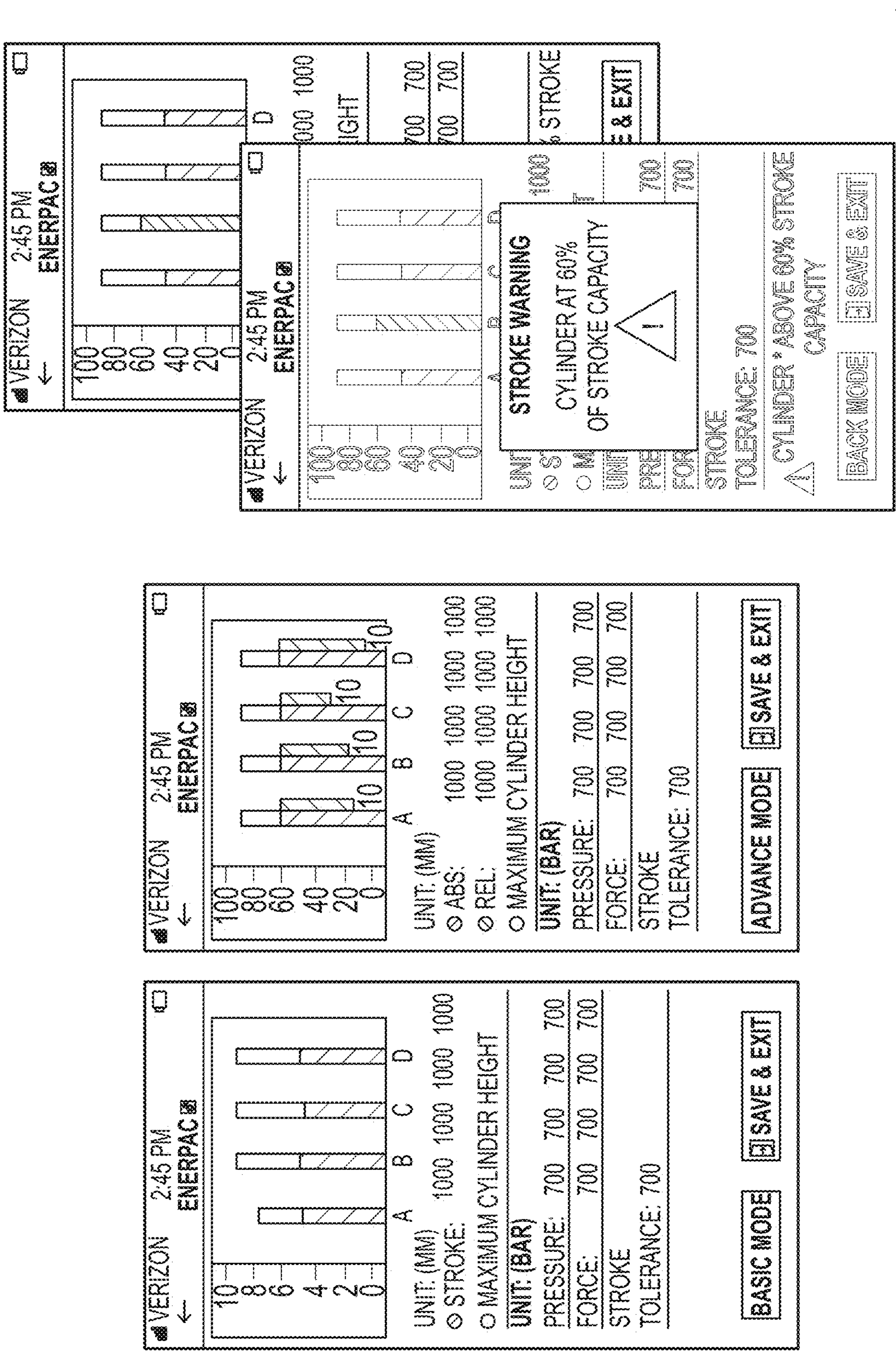
FIG. 14 illustrates example screens of the GUI and a lifting operation for the cylinder sensor assembly.
Figure 14:
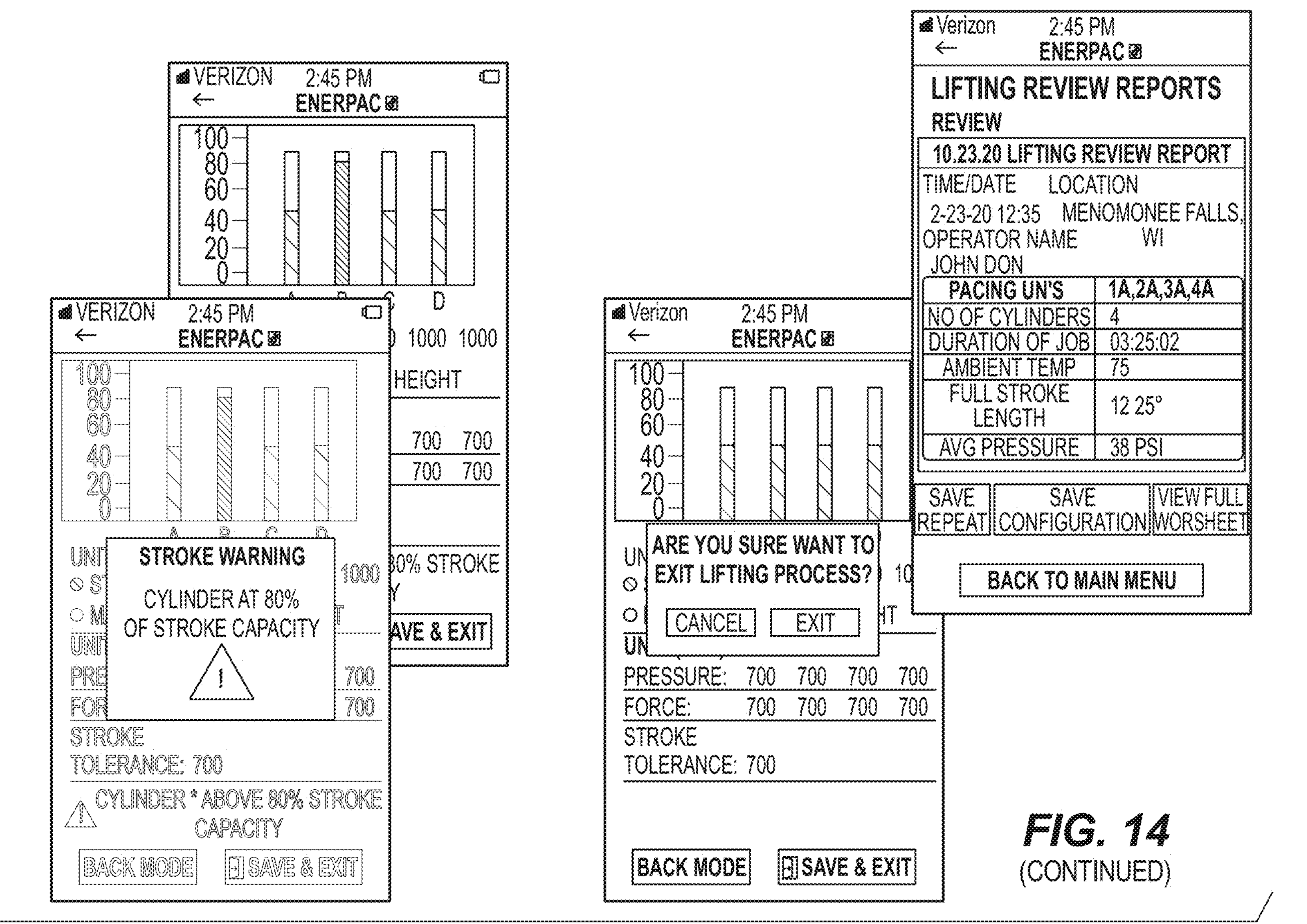

FIG. 11 illustrates example screens during a set-up operation (e.g., in the process shown from left to right) for the sensor assembly 10 and the cylinder assembly 14. FIG. 13 illustrates example screens during a calibration/tare operation (e.g., in the process shown from left to right) for the sensor assembly 10 and the cylinder assembly 14. FIG. 14 illustrates example screens during a lifting operation (e.g., in the process shown from left to right) for the sensor assembly 10 and the cylinder assembly 14. During each illustrated process, the GUI communicates information to the user on the process and receives input(s) from the user.

Once the sensor assembly 10 and the cylinder assembly 14 are set up and ready for use, a lifting operation may be conducted. During the operation (see FIGS. 2A and 2C), the sensor(s) 30, 78, 82 measure the associated characteristic (e.g., piston stroke, fluid pressure, tilt/movement of the sensor assembly 10) and output a signal (e.g., a voltage signal) representative of the measured value to the controller 38.

In the illustrated embodiment, the controller 38 causes the transceiver 42 to output the signals representative of the measured values (e.g., raw data), and calculations using that data are executed by a controller of an external device to determine the actual value (e.g., the actual piston stroke/position, fluid pressure, tilt/movement), rather than by the controller 38 before transmission. Such an arrangement may simplify the computing required for the controller 38. In other embodiments, at least some or all of the calculations may be executed by the controller 38 so that the actual value is output by the sensor assembly 10.

Figures 15A, 15B:
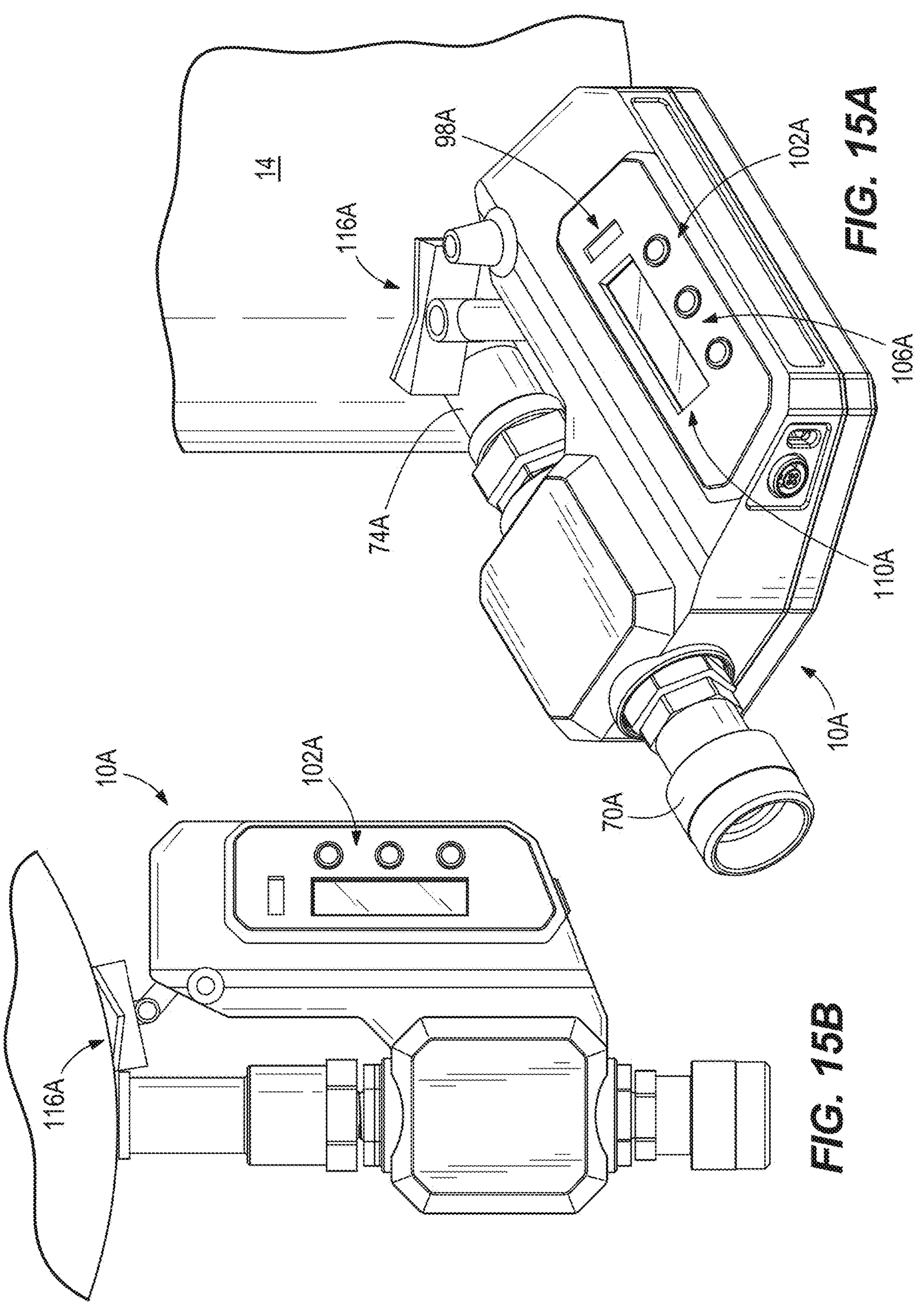
FIGS. 15A-15C are perspective views of an alternative construction of a cylinder sensor assembly.
Figure 15C:
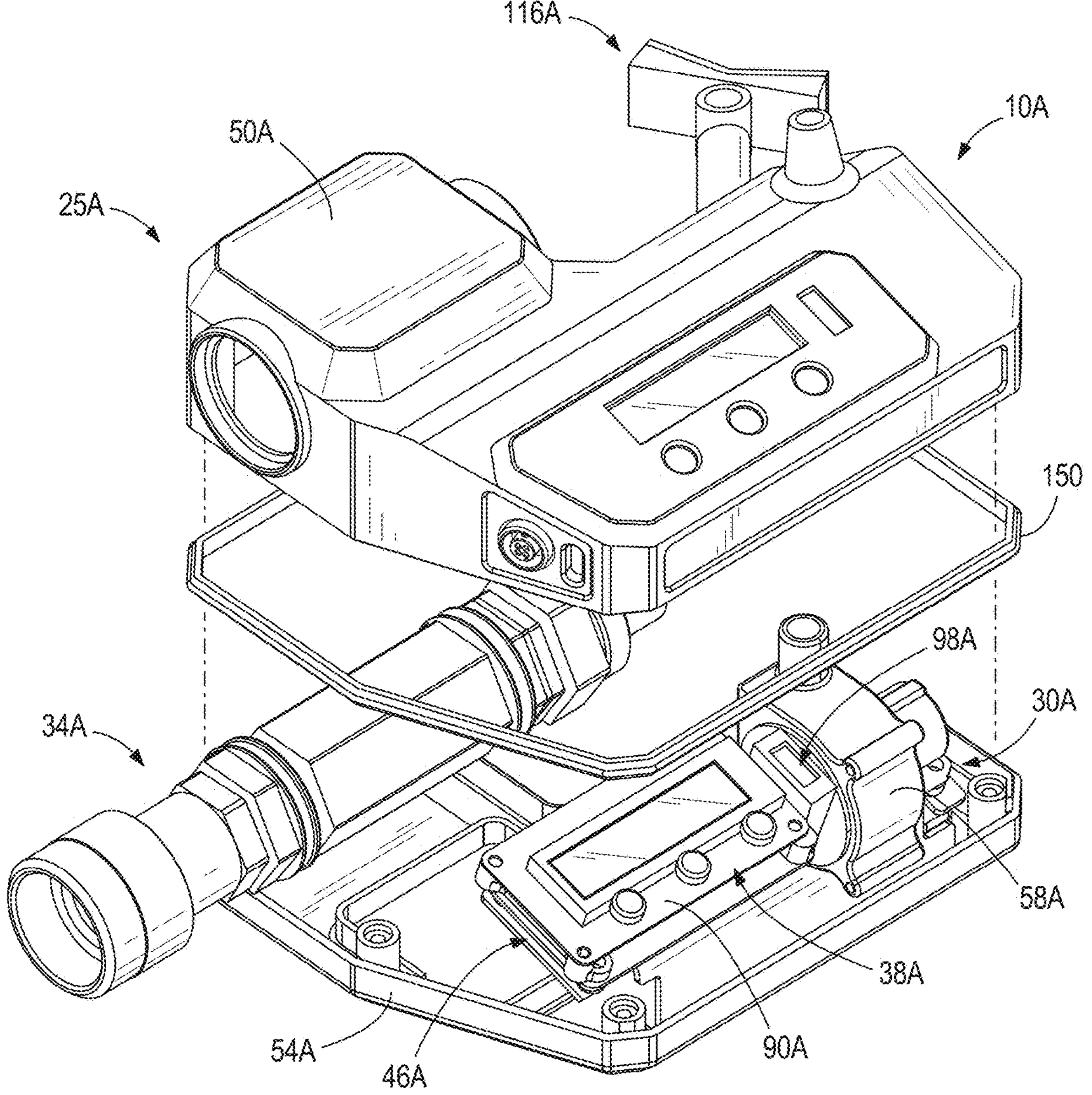

FIGS. 15A-15C illustrate an alternative construction of a cylinder sensor assembly 10A for use with a cylinder assembly 14. The sensor assembly 10A is similar to the sensor assembly described above and illustrated in FIGS. 1-6, and common elements have the same reference number "A".

The sensor assembly 10A generally includes (see FIG. 15C) a housing assembly 26A supporting a position sensor (e.g., a wire stroke sensor 30A, as illustrated), a coupler 34A, a controller 38A, communication components (e.g., a wireless (Bluetooth) transceiver (not shown)), and a power source (e.g., a battery 46A). The illustrated cylinder assembly 10A has an L-shape which wraps around the cylinder assembly 14. The illustrated user interface 102A is angled (non-parallel and non-perpendicular to a support surface (e.g., between about 5° and about 45°, more specifically, between about 15° and about 25°)) for improved viewing by a user standing up and away from a lift being performed by the cylinder assembly 14.

The illustrated housing assembly 26A includes top and bottom housing portions 50A, 54A, and, in the illustrated construction, the components of the sensor assembly 10A are housed in the cavity defined by the portions 50A, 54A. A seal 150 is positioned between the portions 50A, 54A to seal the cavity. The housing assembly 26A supports the support assembly 116A at an angle relative to the coupler 34A to avoid interference with the coupler 34A.

FIGS. 16A-16D illustrate an alternative construction of a cylinder sensor assembly 10B for use with a cylinder assembly 14. The sensor assembly 10B is similar to the sensor assembly 10, 10A described above and illustrated in FIGS. 1-6 and 15A-15C, and common elements have the same reference number "B".

The sensor assembly 10B generally includes (see FIGS. 16A-16B) a housing assembly 26B supporting a coupler 34B and (see FIGS. 16C-16D) a position sensor (e.g., a wire stroke sensor 30B, as illustrated), a controller 38B, communication components (e.g., a wireless (Bluetooth) transceiver (not shown)), and a power source (e.g., a battery 46B).

Figure 16A:
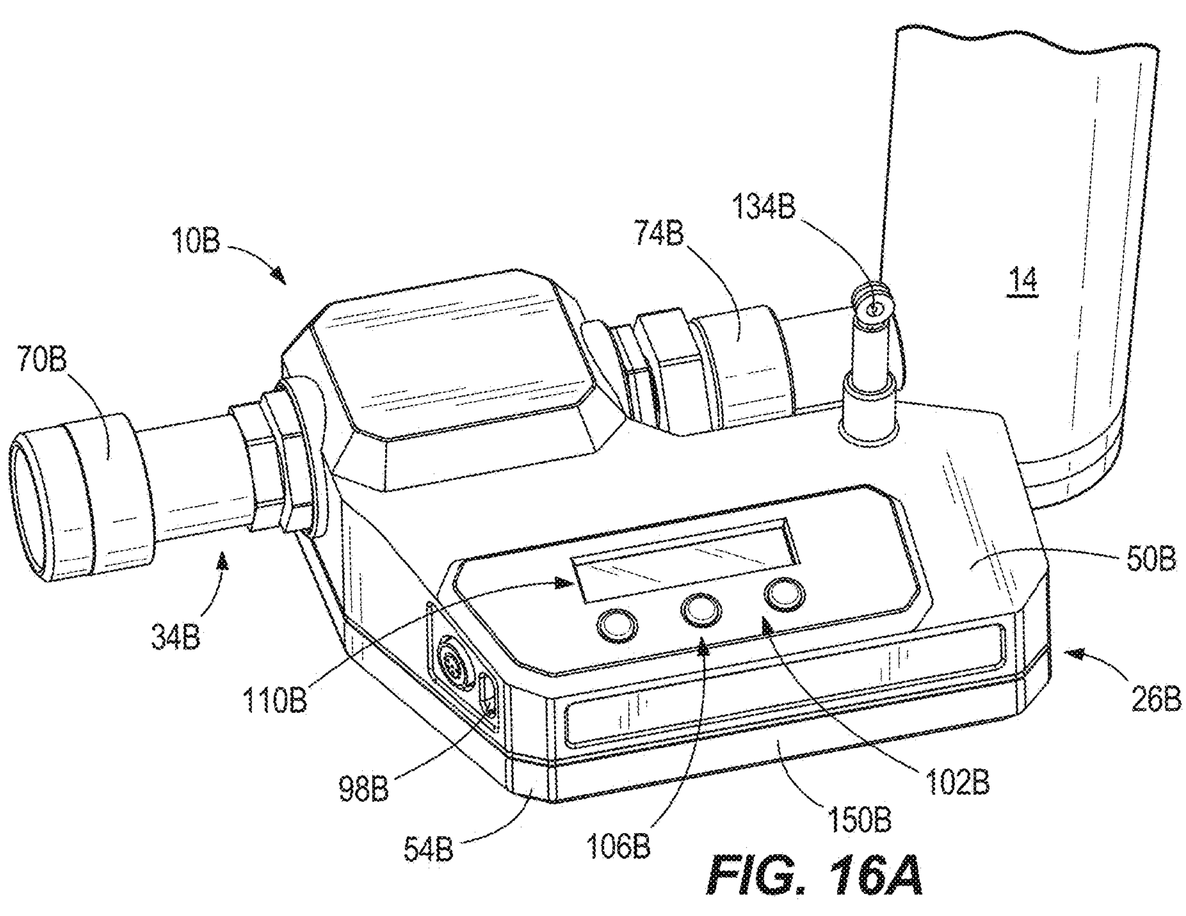
FIGS. 16A-16D are perspective views of another alternative construction of a cylinder sensor assembly.
Figure 16B:
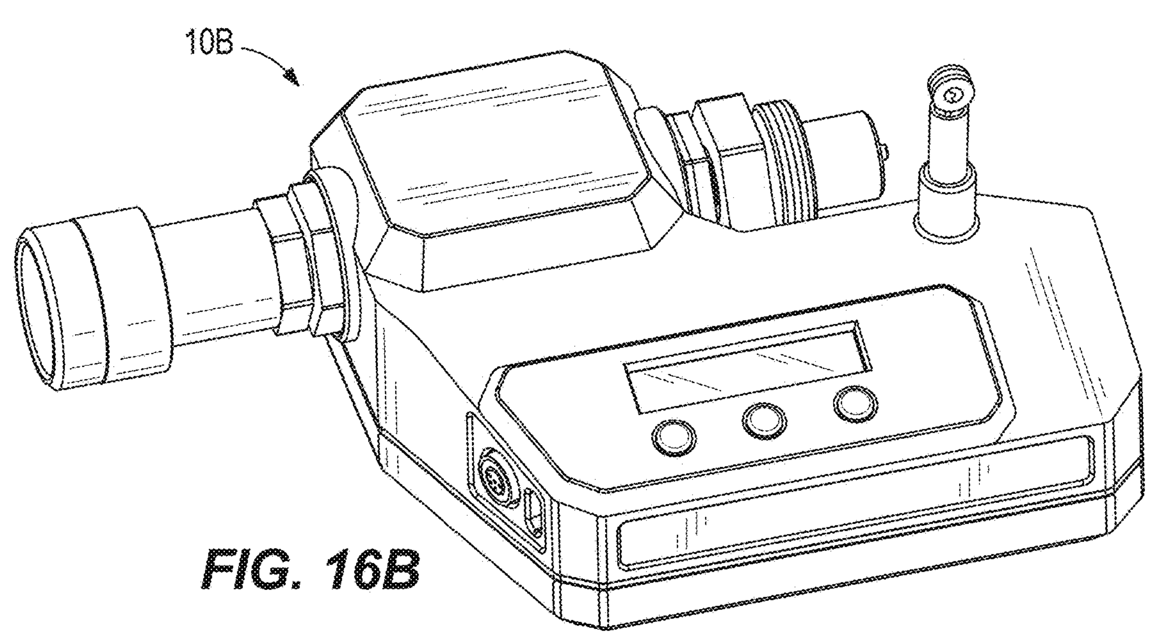
Figures 16C, 16D:
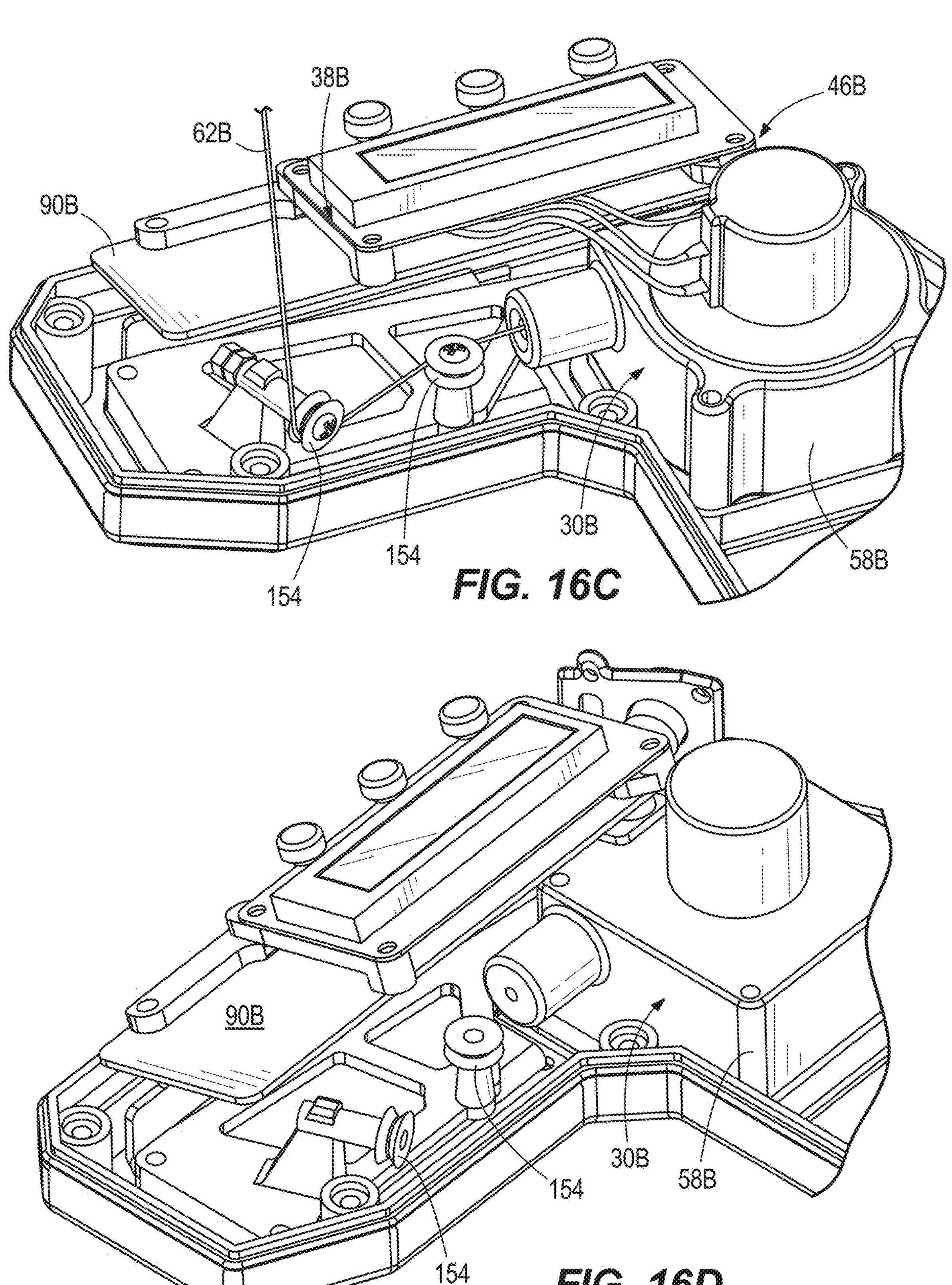

As shown in FIGS. 16C-16D, the wire stroke sensor 30B is positioned on its side in the bottom housing portion 54B with the wire 62B extending in a direction generally transverse to the axis of the cylinder assembly 14. The illustrated orientation of the wire stroke sensor 30B may provide a sensor assembly 10B having a reduced height (compared to the sensor assembly 10, 10A). The illustrated cylinder assembly 10B has an L-shape which wraps around the cylinder assembly 14.

One or more pulleys 154 (two shown) guide and route the wire 62B to extend in a direction substantially parallel to the axis of the cylinder assembly 14. A sensor assembly (not shown) is configured to sense the force of the wire 62B on the pulley(s) 154 and communicate a signal representative of the measured force to the controller 38B. Based on the measured force, the controller 38B may be configured to, for example, determine any offset between the angle of the wire 62B and the axis of the cylinder assembly 14 which may affect the measured position.

Figures 17A, 17B:
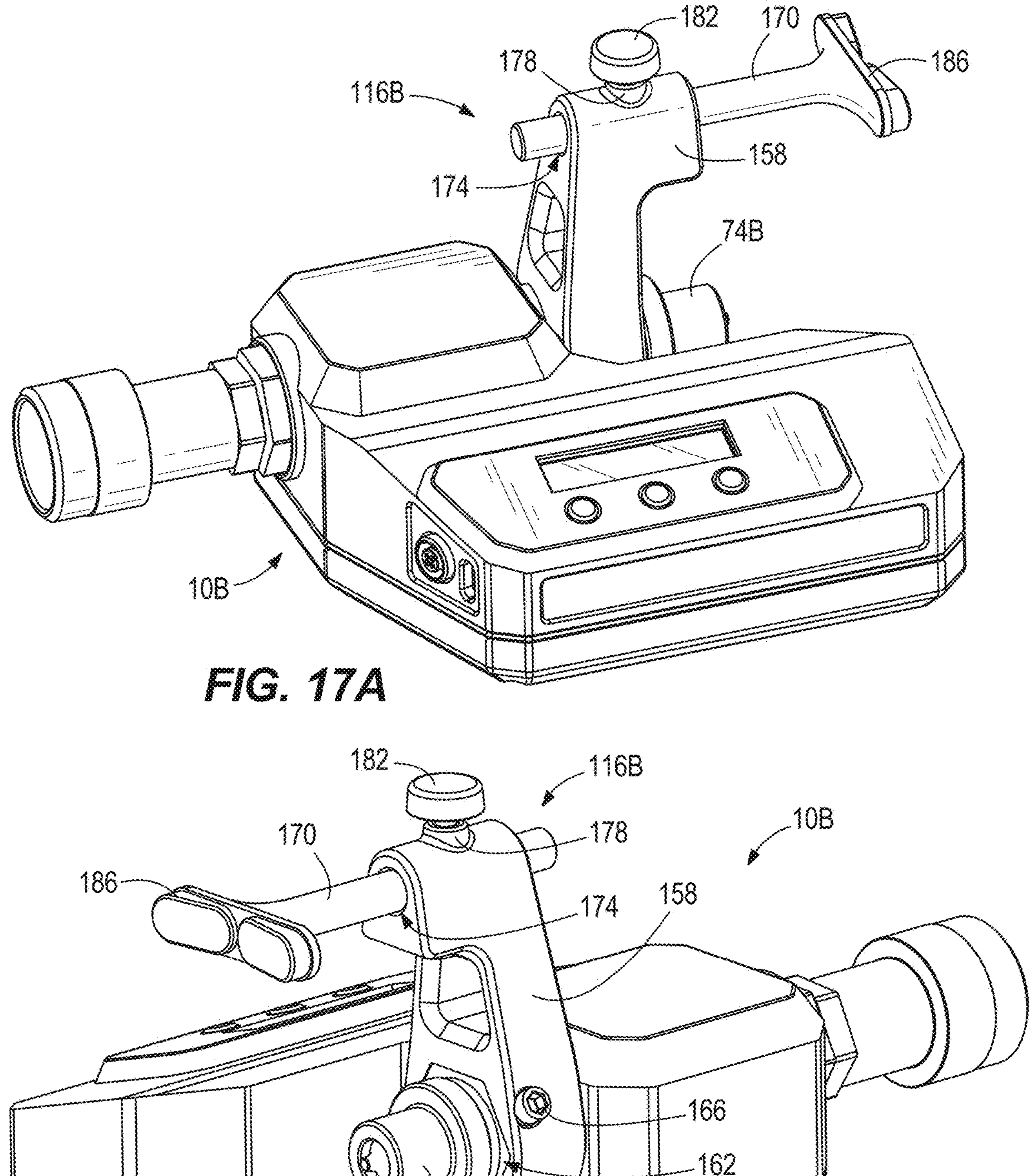
FIGS. 17A-17B are perspective views of the cylinder sensor assembly shown in FIGS. 16A-16D, illustrating a reaction arm assembly.

FIGS. 17A-17B illustrate an alternative construction of a support assembly 116B for the sensor assembly (e.g., the sensor assembly 10B, as shown). The illustrated support assembly 116B does not inhibit operation and connection of the coupler 34B and the cylinder assembly 14.

The support assembly 116B includes a frame member 158 supported by the sensor assembly 10B. In the illustrated construction, the frame member 158 is supported by the coupler 34B, on the port connector 74B, and defines an opening 162 for receiving the port connector 74B. The frame member 158 is pivotable about the port connector 74B, and a locking member (a set screw 166, as shown) engages between the frame member 158 and the coupler 34B to hold the frame member 158 in position.

At the opposite end, the frame member 158 supports a bracing arm 170. The illustrated arm 170 is adjustably positioned relative to the frame member 158 and is slidably received in an arm opening 174. A threaded member 178 with an actuator knob 182 engages and releasably holds the arm 170 in a selected position. A jaw member 186 is supported on the end of the arm 170 and engages the cylinder 22. In some constructions (see FIGS. 15A-15B), the jaw member 186 is pivotably coupled to the end of the arm 170 to, for example, accommodate different size cylinder assemblies 14, different relative positions, etc.

With the pivotable frame member 158 and the adjustable arm 170, the support assembly 116B is adjustable to accommodate different positions of the sensor assembly 10B relative to the cylinder assembly 14. Also, components of the support assembly 116B may be substituted for components having different characteristics (e.g., dimensions (for example, frame members 158 of different heights, arms 170 of different lengths), shapes (for example, different jaw members 186 with different shapes (see FIGS. 21A-21F)), materials, etc.) or replaced if damaged or worn.

Figures 18A, 18B:
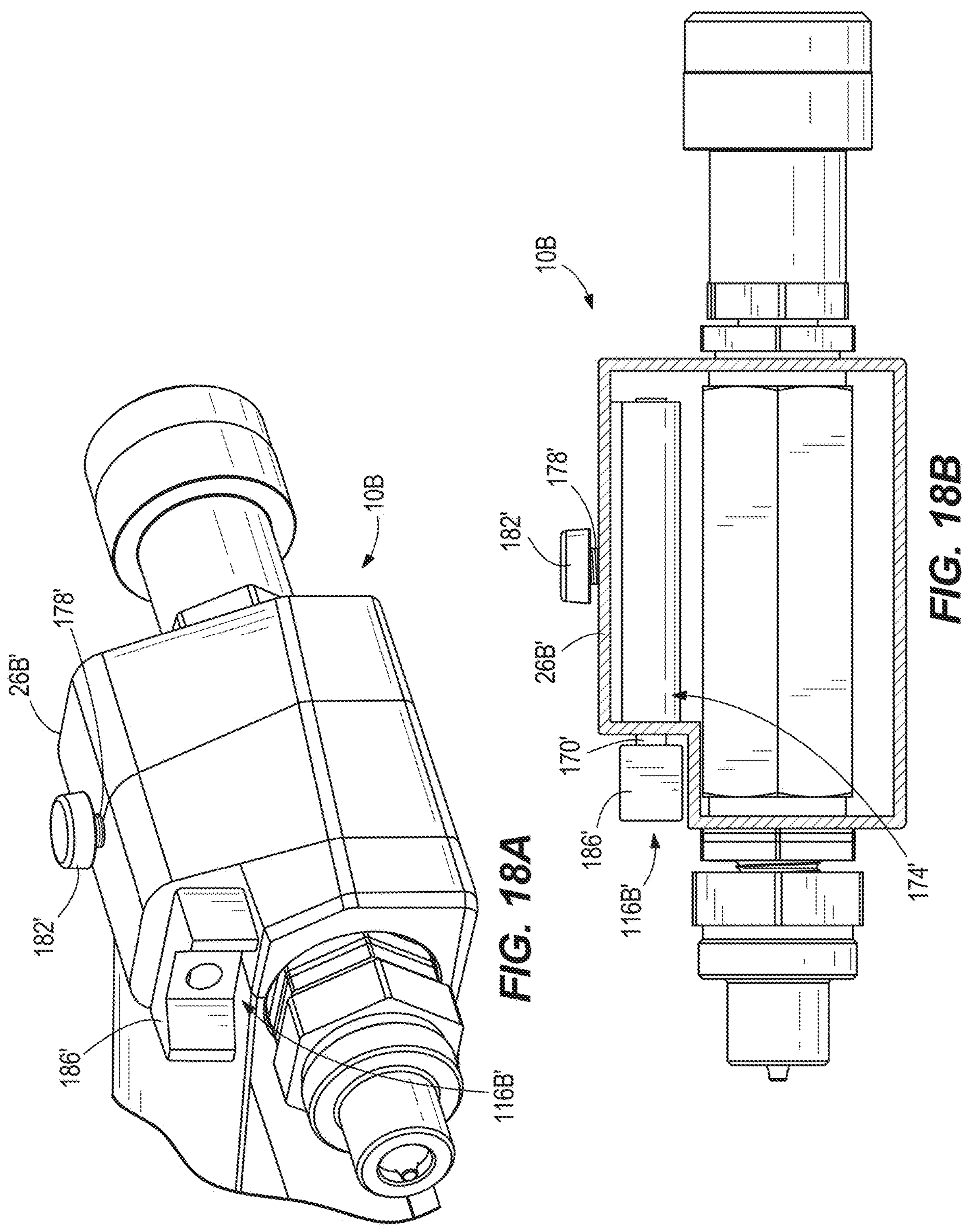
FIGS. 18A-18B are top views of the cylinder assembly shown in FIGS. 16A-16D, illustrating an alternative construction of a bracing arm assembly.

FIGS. 18A-18B illustrate an alternative construction of a support assembly 116B'. The support assembly 116B' includes an arm 170' which slides out of the housing assembly 26B'. The housing assembly 26B' defines an opening 174' slidably receiving the arm 170'. In the illustrated construction, the arm 170' and the opening 174' have a non-circular cross-section (e.g., a D-shape) to inhibit pivoting of the arm 170' and the jaw member 186' relative to the housing assembly 26B' and maintain the jaw member 186' in a proper orientation for engagement with the cylinder assembly 14. A threaded member 178' with an actuator knob 182' engages and releasably holds the arm 170' in a selected position.

Figures 19A, 19B:
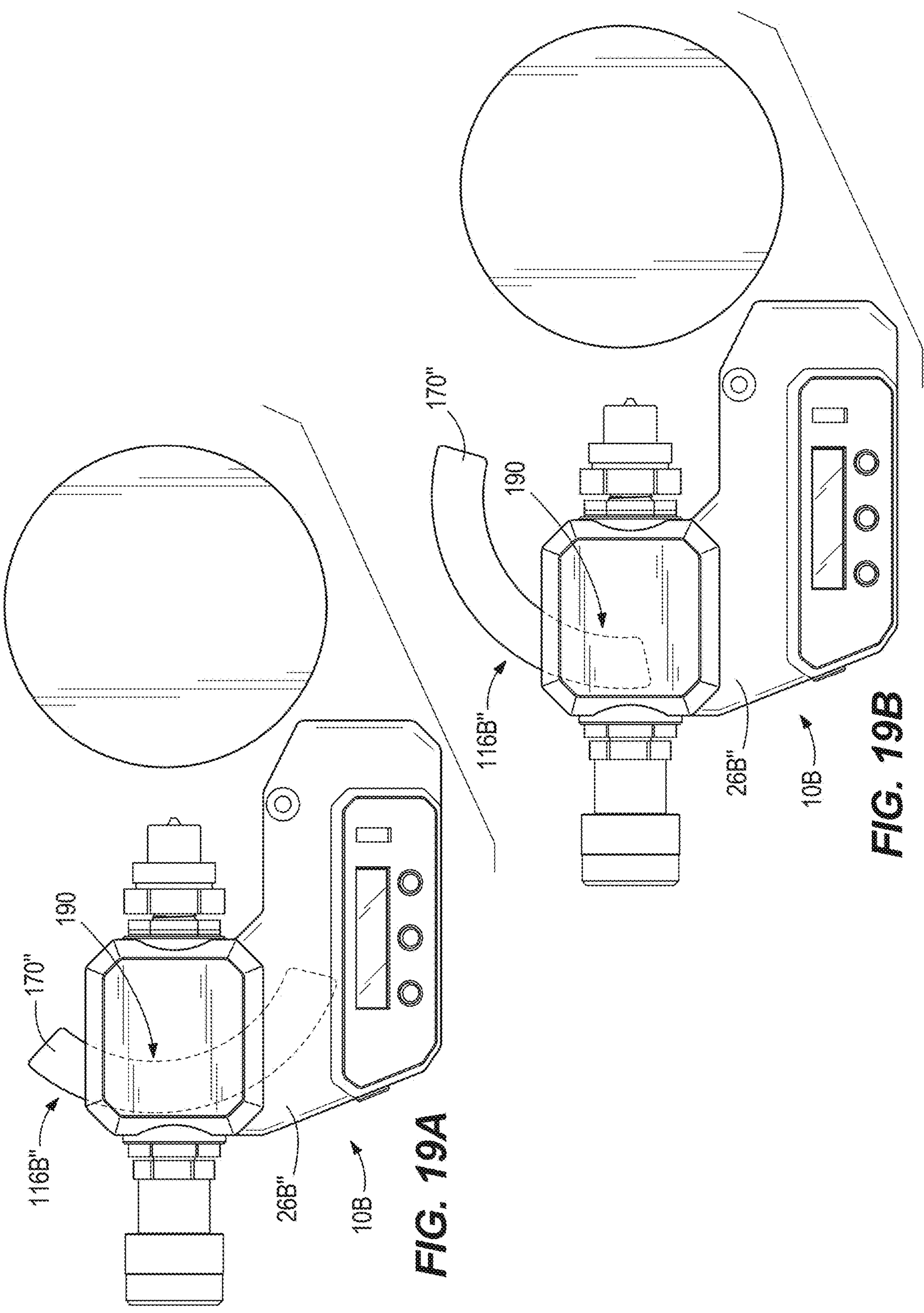
FIGS. 19A-19B are top views of the cylinder assembly shown in FIGS. 16A-16D, illustrating another alternative construction of a bracing arm assembly.
Figures 20A, 20B, 20C, 20D, 20E:
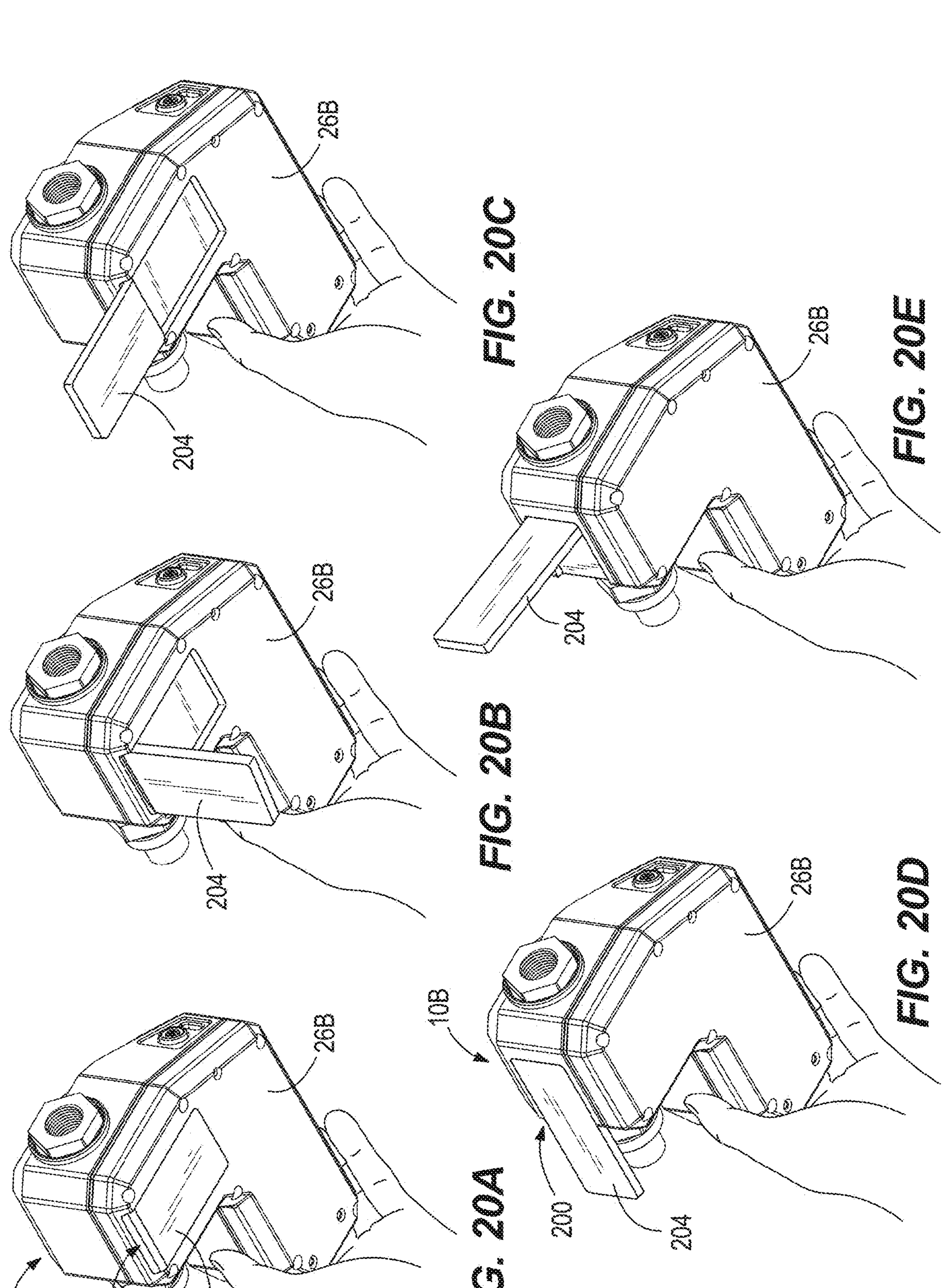
FIGS. 20A-20E are perspective views of the cylinder sensor assembly shown in FIGS. 16A-16D, illustrating yet another alternative construction of a bracing arm assembly.

FIGS. 19A-19B illustrate another alternative construction of a support assembly 116B". The support assembly 116B" includes an arm 170" which slides (e.g., arcuately) out of the housing assembly 26B". The housing assembly 26B" defines a slot 190 receiving the arm 170". A locking member (not shown) is configured to hold the arm 170" in position.

FIGS. 20A-20E illustrates an alternative support assembly 200 for the sensor assembly 10B. Rather than bracing against the cylinder assembly 14, the support assembly 200 enlarges the footprint of the housing assembly 26B against a support surface (e.g., the ground, a wall, the cylinder assembly 14). The support assembly 200 includes a support member 204 that is movable (e.g., pivotable (as shown), slidable, etc.) from at least substantially within the extent of the housing assembly 26B (see FIGS. 20A and 20D) to beyond the extent (see FIGS. 20B-20C and 20E) to provide a larger support area. When not in use (see FIGS. 20A and 20D), the support member 204 is stored in a position which minimizes the size of the sensor assembly 10B.

Each support assembly 116-116B", 200 inhibits movement of the sensor assembly 10-10B". Such movement may, for example, be caused by flow of hydraulic fluid through the connected hoses, pull on the wire stroke sensor 30-30B", etc. The support assembly 116-116B", 200 is configured to maintain the sensor assembly 10-10B" in a position in which the wire 62 of the wire stroke sensor 30 is in alignment (e.g., substantially parallel) with the axis of the piston 18.

FIGS. 21A-21F illustrate alternative constructions of the jaw member 186 for use with the support assemblies 116-116B". The jaw members 186 may be selected for engagement with different cylinder assemblies (e.g., different size cylinders 22), different relative positions or orientations of the components, etc.

Figures 21A, 21B, 21C, 21D, 21E, 21F:
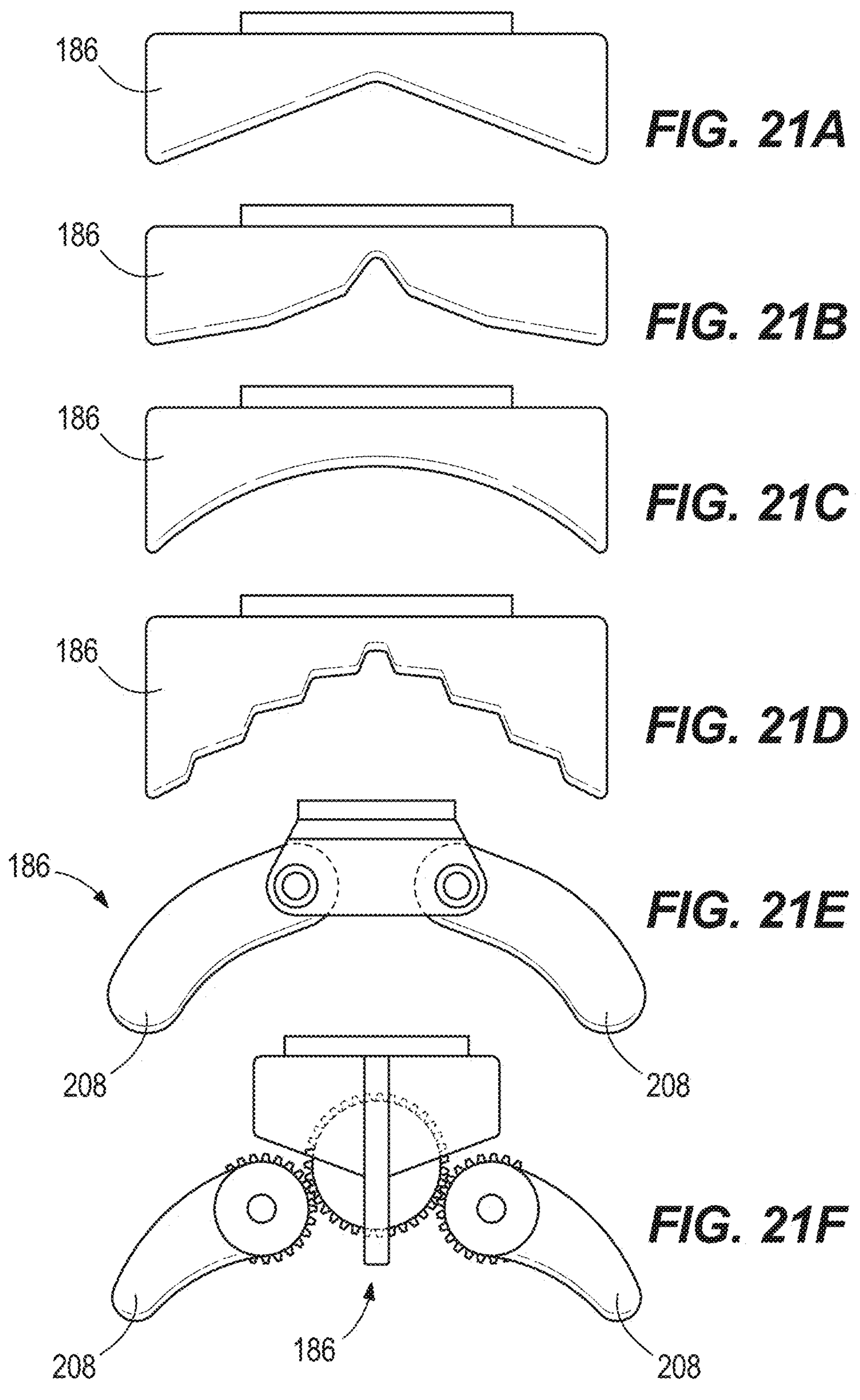
FIGS. 21A-21F are top views of alternative constructions of a jaw assembly for the bracing arm assemblies.

In the FIGS. 21A-21B, the jaw member 186 has a V-shaped engagement surface (a single "V" shape in FIG. 21A; multiple different "V" shapes in FIG. 21B). In FIG. 21D, the jaw member 186 has a stepped engagement surface.

In FIGS. 21C and 21E-21F, the jaw member 186 has a curved engagement surface, with the engagement surface being fixed in FIG. 21C and adjustable in FIGS. 21E-21F. The adjustable jaw member 186 of FIGS. 21E-21F includes movable (e.g., pivotable) jaw portions 208 to adjust the shape of the engagement surface.

Figures 22A, 22B, 22C:
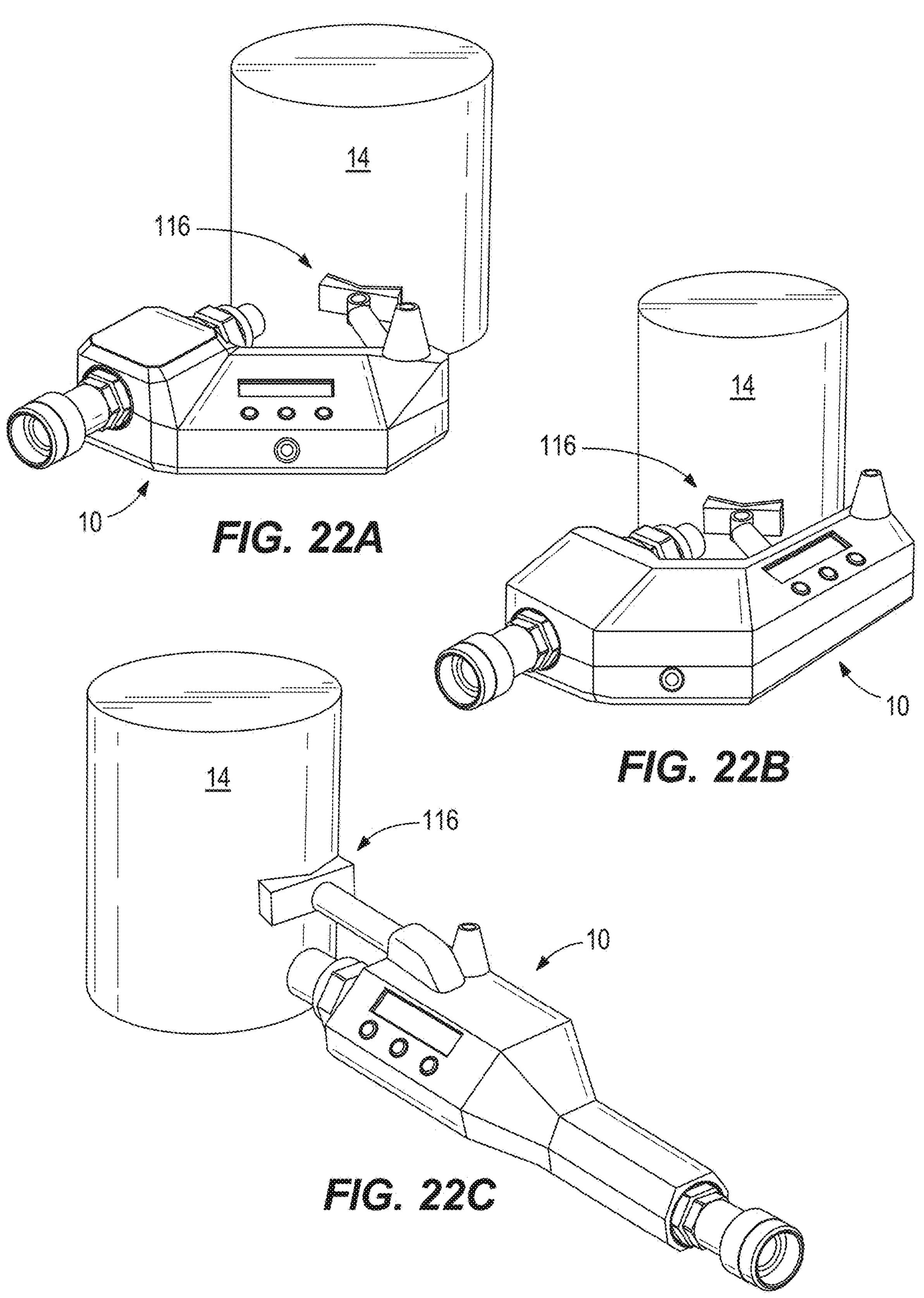
FIGS. 22A-22C are perspective views of additional alternative constructions of a cylinder sensor assembly.

FIGS. 22A-22C illustrate additional alternative constructions of the sensor assembly 10. In FIGS. 22A-22B, the sensor assembly 10 is constructed to wrap around the cylinder assembly 14 and to position the support assembly 116 to avoid interference with the coupler 34. In FIG. 22C, the sensor assembly 10 is generally linear and constructed along the coupler 34 with the support assembly 116 positioned above the coupler 34.

Figure 23A:
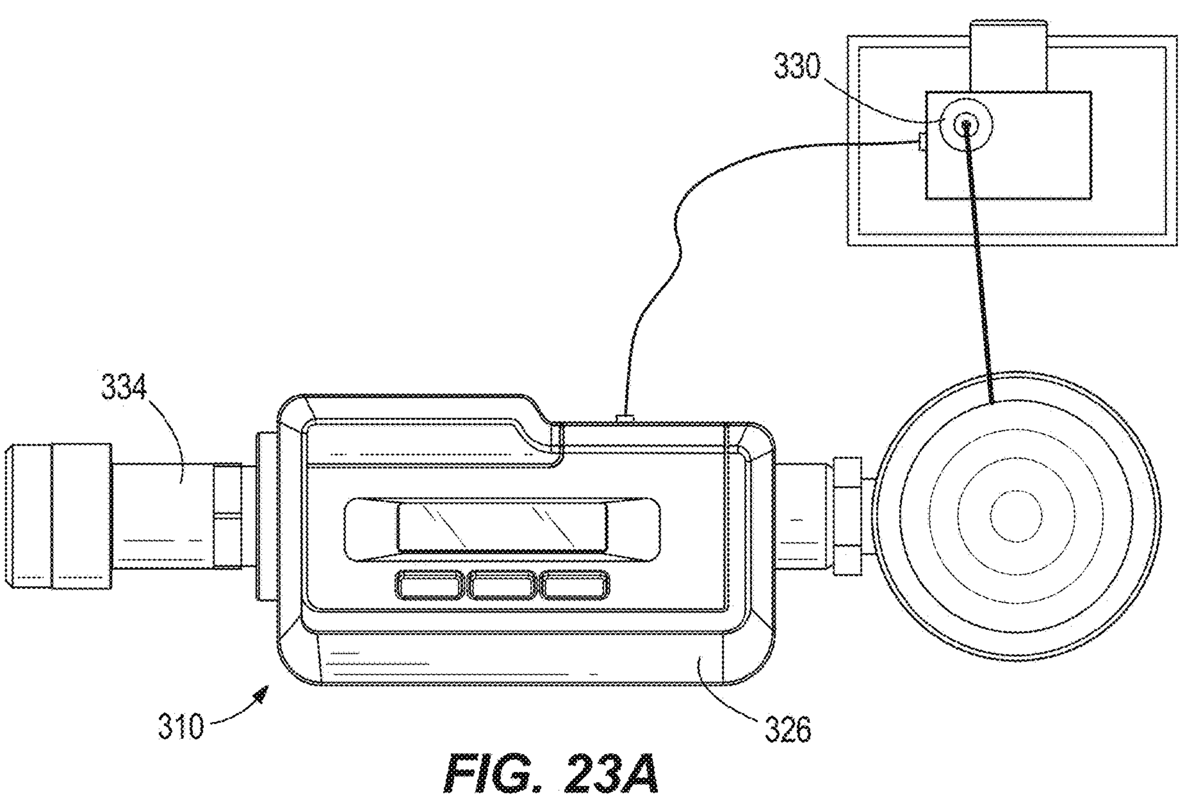
FIG. 23A-23B are top views of alternative constructions of a cylinder sensor assembly.
Figure 23B:
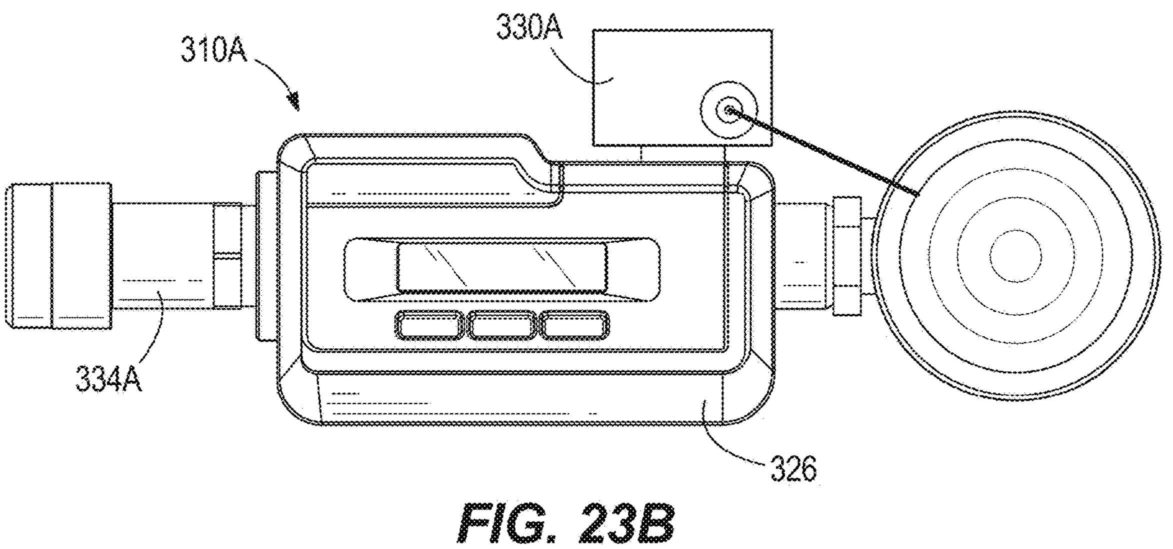

FIGS. 23A-23B illustrate additional alternative constructions of the sensor assembly 310, 310A. In the sensor assemblies 310, 310A, the position sensor (the wire stroke sensor 330, 330A) is housed separately from the other components (e.g., the coupler 334, 334A, the controller (not shown), the power source (not shown), the user interface 402, 402A, etc.) of the sensor assembly 310, 310A.

In FIG. 23A, the position sensor is positioned remotely from the housing assembly 326 and in communication with the controller via a wired (e.g., by a cable or cord) or wireless connection. In FIG. 23B, the position sensor is mechanically connected to the housing assembly 326A and connects to the controller via a wired connection (e.g., inter-engaging communication terminals) or wirelessly.

Figure 24A:
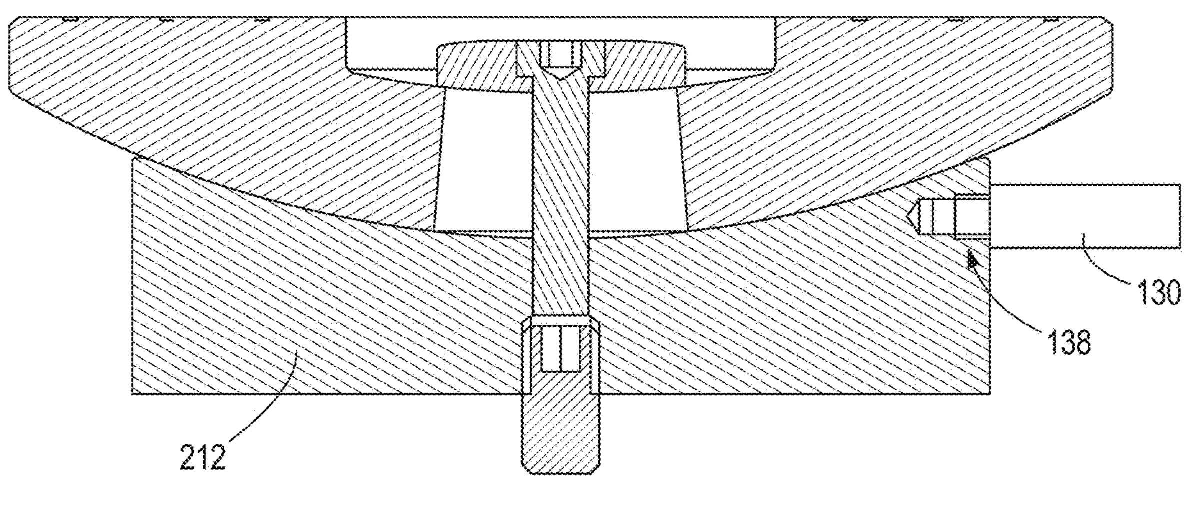
FIGS. 24A-24B are side views of a portion of alternative constructions of a position sensor interface assembly.
Figure 24B:
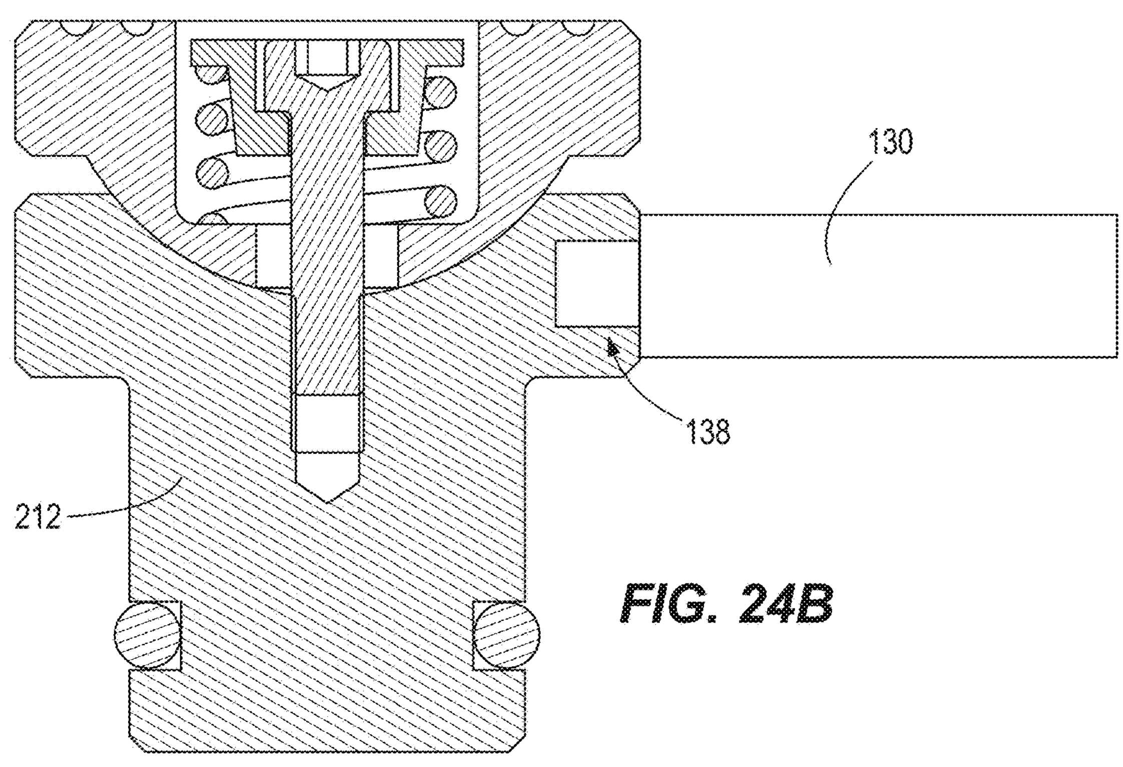

FIGS. 24A-24B illustrate engagement of position sensor interface assembly (e.g., the pin 130) with the piston 18. Depending on its length and desired stiffness, the pin 130 has a diameter of at least about 8 millimeters (mm).

As shown, the saddle 212 defines the opening 138 to receive the end of the pin 130. In the illustrated constructions, the opening 138 and the end of the pin 130 include complementary threads. In FIG. 24A, the illustrated saddle 212 is a tilt saddle for a 500 Ton (t) cylinder assembly 14 and, in FIG. 24B, for a 10-15 t cylinder assembly 14. In other constructions (not shown), the saddle 212 may be a different type of saddle and/or for a different type of cylinder assembly 14. Also, in other constructions (not shown), the pin 130 may engage a different portion of the piston 18.

Figure 25:
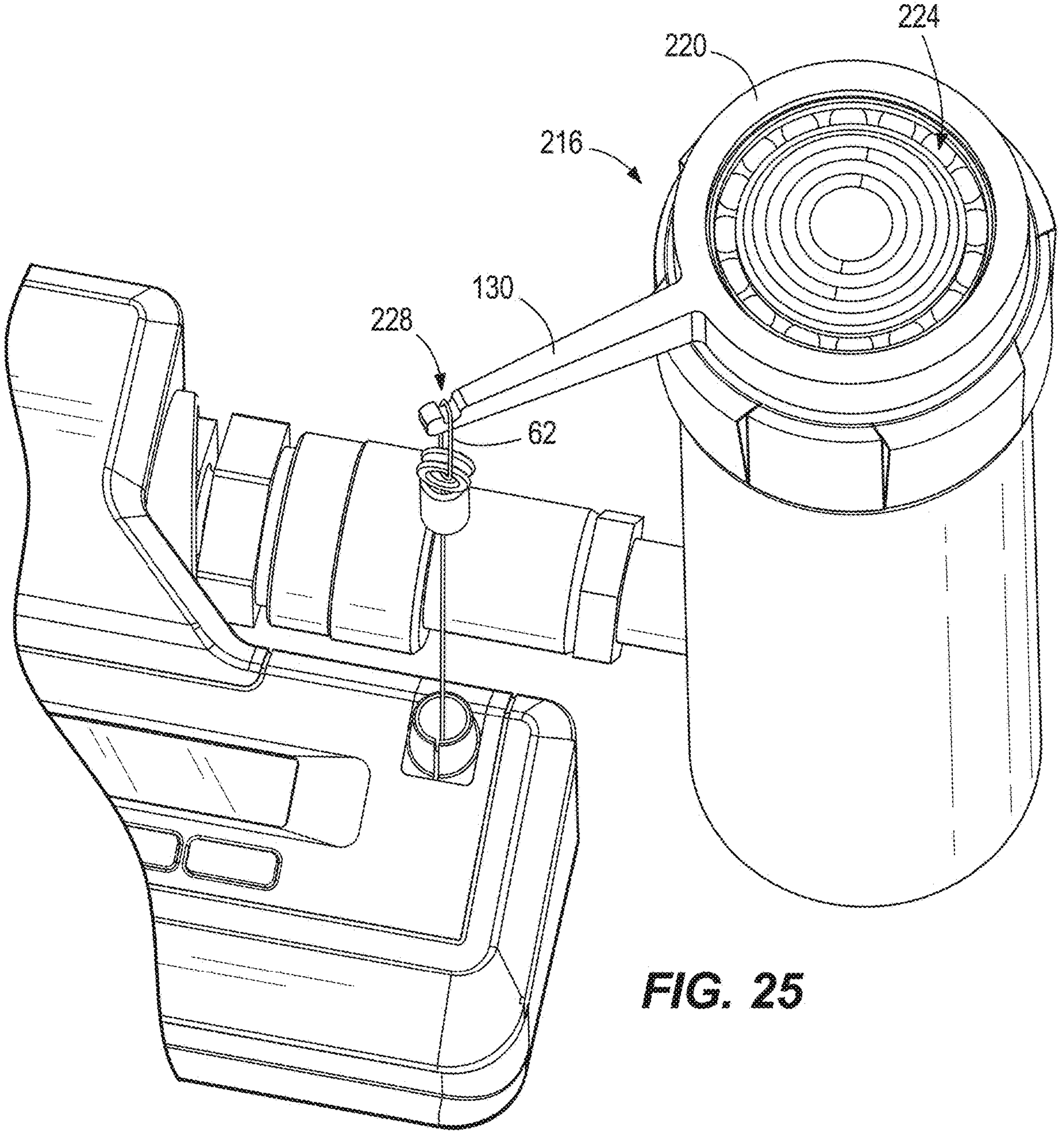
FIG. 25 is a perspective view of a position sensor interface assembly for use with a cylinder sensor assembly and a cylinder assembly.

FIG. 25 illustrates an alternative construction of a position sensor interface assembly 216. The interface assembly 216 may be provided as an accessory for use with the sensor assembly 10 and the cylinder assembly 14.

The interface assembly 216 includes a ring 220 supported on the end of the piston 18. In the illustrated construction, a bearing assembly 224 (e.g., a ball bearing assembly) is between the ring 220 and the piston 18 to accommodate movement (e.g., pivoting movement) of the ring 220 relative to the piston 18, for example, due to movement caused by flow of hydraulic fluid through the connected hoses, the pull on the wire stroke sensor 130, etc. The interface assembly 216 is configured to maintain the wire 162 of the wire stroke sensor 130 in alignment (e.g., substantially parallel) with the axis of the piston 18.

The pin 130 is connected to the ring 220 and, as illustrated, is formed with the ring 220. In other constructions (not shown), the pin 130 may be separate from and connected to the ring 220 in a manner similar to that described above for the connection of the pin 130 to the saddle 212 (e.g., with inter-engaging threaded portions). The pin 130 has a recess 228 to receive the wire 62 of the stroke sensor 30.

Figures 26A, 26B, 26C:
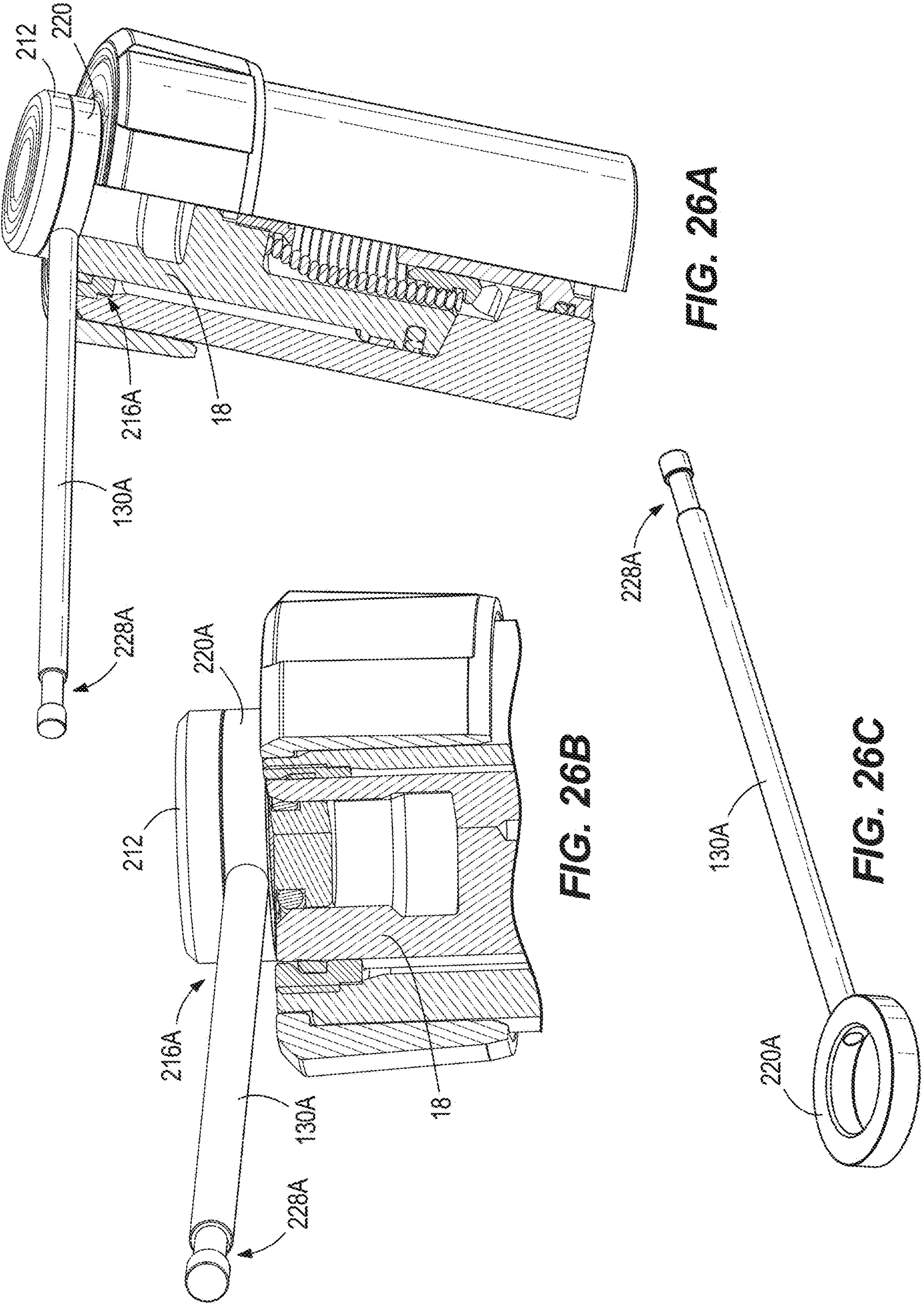
FIGS. 26A-26C are perspective views of an alternative construction of a position sensor interface assembly.

FIGS. 26A-26C illustrate an alternative construction of a position sensor interface assembly 216A. The interface assembly 216A includes a ring 220A sandwiched between the saddle 212 and the end of the piston 18. The pin 130A is connected to the ring 220A, for example, with inter-engaging threads (not shown). In other constructions (not shown), the pin 130A may be formed with the ring 220A. The pin 130A has an annular recess 228A for receiving the wire 62 of the stroke sensor 30.

In illustrated embodiments, the sensor assembly 10-10B" may generally provide an integrated piston position and/or hydraulic pressure sensor (to sense piston movement and/or fluid flow) with wireless communications. For some aspects, the sensor assembly 10-10B" is self-contained and battery powered.

The independent embodiments described above and illustrated in the figures are presented by way of example only and are not intended as a limitation upon the concepts and principles of the present disclosure. As such, it will be that various changes in the elements and their configuration and arrangement are possible without departing from the spirit and scope of the present disclosure. For example, various alternatives to the certain features and elements are described with reference to specific embodiments or constructions. With the exception of features, elements, and manners of operation that are mutually exclusive of or are inconsistent with each embodiment or construction described above, it should be noted that the alternative features, elements, and manners of operation described with reference to one particular embodiment are applicable to the other embodiments or constructions.

What is claimed is:

1. A system comprising:

a piston-cylinder assembly including a cylinder and a piston movably supported relative to the cylinder;

a sensor assembly including a housing, a sensor configured to sense a position of the piston relative to the cylinder, a wireless transmitter supported by the housing and configured to output a communication signal that is representative of a sensed position of the piston, and an electronic processor supported by the housing and in communication with the sensor and the wireless transmitter; and wherein the sensor assembly further includes a hydraulic coupler in fluid communication between a source of fluid and the cylinder, and the housing being separate from the cylinder and supported on the hydraulic coupler.

2. The system of claim 1, further comprising an external device configured to receive the communication signal from the wireless transmitter and including a display configured to communicate to a user information based on the communication signal.

3. The system of claim 1, wherein the sensor assembly further includes a wireless transceiver supported by the housing and configured to receive a signal from an external transmitter, the wireless transceiver including the wireless transmitter, further comprising an external device including a user input device configured to receive an input from a user, the external device being configured to output to the wireless transmitter the signal based on the input.

4. The system of claim 1, wherein the sensor includes a wire stroke sensor supported by the housing, and wherein the wire stroke sensor includes a sensor housing, a sensor device supported by the housing, and a wire connected to the sensor device and extending from the sensor housing, the wire having an end couplable to the piston, movement of the piston relative to the housing causing the wire to apply a force to the sensor device.

5. The system of claim 4, wherein the housing defines an opening, the wire extending through the opening to be coupled to the piston, and wherein the wire extends from the housing in a direction generally parallel to an axis of the piston, and wherein the wire stroke sensor is supported in the housing with the wire extending from the sensor housing to the opening generally along the direction.

6. The system of claim 4, wherein the wire extends from the housing in a first direction generally parallel to an axis of the piston, and wherein the wire stroke sensor is supported in the housing with the wire extending from the sensor housing generally in a second direction different than the first direction.

7. The system of claim 6, wherein the sensor assembly further includes a pulley supported in the housing, the wire being guided around the pulley from the second direction to the first direction.

8. The system of claim 4, further comprising a position sensor interface couplable between the wire stroke sensor and the piston, wherein the wire stroke sensor includes a wire, and wherein the position sensor interface includes a pin couplable with the piston and having an end that receives the wire.

9. The system of claim 1, wherein the sensor assembly further includes a pressure sensor supported by the housing, the pressure sensor being configured to sense a pressure of a fluid supplied to the cylinder.

10. The system of claim 9, wherein the pressure sensor includes a strain gauge.

11. The system of claim 9, the pressure sensor engaging the hydraulic coupler to sense a pressure of the fluid supplied to the cylinder.

12. The system of claim 11, wherein the hydraulic coupler has an outer surface defining a groove, the pressure sensor engaging the groove.

13. The system of claim 11, wherein the hydraulic coupler defines a passage for hydraulic fluid to pass between the source and the cylinder and an opening communicating with the passage, the pressure sensor extending into the opening.

14. The system of claim 9, wherein the wireless transmitter is configured to output a communication signal that is representative of a sensed fluid pressure.

15. The system of claim 9, wherein the sensor assembly further includes a first port on the housing and in fluid communication with a fluid supply and a second port on the housing and in fluid communication with the cylinder, the pressure sensor being configured to sense fluid pressure between the first port and the second port.

16. The system of claim 1, wherein the sensor assembly further includes a user interface supported by the housing, the user interface includes a display supported by the housing and configured to communicate information to a user.

17. The system of claim 16, wherein the housing has a first housing portion engageable with a support surface to support the sensor assembly on the support surface, and a second housing portion having a non-parallel and non-perpendicular orientation relative to the first housing portion, the display being supported on the second housing portion.

18. The system of claim 1, wherein the sensor assembly further includes a support member supported by the housing and engageable with the cylinder, the support member being configured to maintain a position of the sensor assembly relative to the cylinder.

19. The system of claim 18, wherein the support member includes a jaw having an engagement surface engageable with the cylinder.

20. The system of claim 18, wherein the support member is movably supported relative to the housing.

21. The system of claim 20, wherein the sensor assembly further includes a locking member engageable with the support member to releasably retain the support member in a position relative to the housing.

22. A method of operating a piston-cylinder assembly, the method comprising:

supporting a housing on a cylinder;

sensing, with a wire stroke sensor supported in the housing, a position of a piston relative to the cylinder;

wirelessly communicating, with a wireless transmitter supported by the housing, a communication signal that is representative of a position sensed by the wire stroke sensor; and with a pressure sensor supported by the housing, sensing a pressure of fluid supplied to the cylinder wherein sensing a pressure includes sensing, with the pressure sensor, a pressure of a fluid between a first port on the housing and in fluid communication with a fluid supply and a second port on the housing and in fluid communication with the cylinder.

23. The method of claim 22, wherein wirelessly communicating includes wirelessly communicating to an external device configured to receive the communication signal from the wireless transmitter, and wherein the method further comprises displaying, on the external device, information based on the communication signal.

24. The method of claim 23, wherein wirelessly communicating further includes wirelessly communicating, with the wireless transmitter, a communication signal that is representative of a sensed fluid pressure.

* * * * *